United States Patent
Probst et al.

(10) Patent No.: US 9,046,114 B1
(45) Date of Patent: Jun. 2, 2015

(54) TRANSMISSION ASSEMBLY HAVING AN EXPANSION BLADDER

(75) Inventors: Jesse L. Probst, Strasburg, IL (US); Eric S. Phanco, Decatur, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 615 days.

(21) Appl. No.: 13/459,858

(22) Filed: Apr. 30, 2012

Related U.S. Application Data

(62) Division of application No. 13/336,321, filed on Dec. 23, 2011.

(60) Provisional application No. 61/427,002, filed on Dec. 23, 2010.

(51) Int. Cl.
| | | |
|---|---|---|
| *F16D 31/00* | (2006.01) | |
| *F16D 31/02* | (2006.01) | |
| *F15B 21/04* | (2006.01) | |
| *F15B 11/08* | (2006.01) | |

(52) U.S. Cl.
CPC ............. *F15B 21/042* (2013.01); *F15B 11/08* (2013.01)

(58) Field of Classification Search
CPC ...... F15B 21/042; F15B 21/045; F15B 11/08; F16H 61/444
USPC .................................... 60/329, 453, 387, 389
See application file for complete search history.

(56) References Cited

U.S. PATENT DOCUMENTS

| | | | |
|---|---|---|---|
| 2,195,877 A | 4/1940 | Steedman | |
| 3,087,734 A | 4/1963 | Klingler | |
| 4,791,824 A | 12/1988 | Adam-Nicolau | |
| 4,987,796 A * | 1/1991 | von Kaler et al. | 74/606 R |
| 5,236,061 A | 8/1993 | Haupt | |
| 5,314,387 A | 5/1994 | Hauser et al. | |
| 6,185,936 B1 | 2/2001 | Hauser et al. | |
| 6,354,975 B1 * | 3/2002 | Thoma | 475/83 |
| 6,651,529 B1 | 11/2003 | Poplawsli et al. | |
| 6,843,747 B1 * | 1/2005 | Phanco et al. | 475/161 |
| 7,210,294 B1 * | 5/2007 | Langenfeld | 60/487 |
| 7,926,266 B1 | 4/2011 | Wigness et al. | |
| 7,926,624 B1 | 4/2011 | Taylor | |
| 2011/0192158 A1 | 8/2011 | Simon | |

OTHER PUBLICATIONS

U.S. Appl. No. 13/336,214, filed Dec. 23, 2011.

\* cited by examiner

*Primary Examiner* — Edward Look
*Assistant Examiner* — Daniel Collins
(74) *Attorney, Agent, or Firm* — Neal, Gerber & Eisenberg LLP

(57) ABSTRACT

A transaxle includes an expansion bladder disposed in a sump for a hydraulic transmission, where the expansion bladder forms an air chamber separate from the sump and open to atmospheric pressure. The expansion bladder includes a set of ribs formed on an internal surface of a wall structure and extending into the air chamber to prevent unwanted collapse of the expansion chamber and improve its ability to collapse in a controlled manner as oil in the sump expands.

24 Claims, 21 Drawing Sheets ns assembly of FIG. 1.

TRANSMISSION ASSEMBLY HAVING AN EXPANSION BLADDER

This application is a divisional and claims the benefit of U.S. application Ser. No. 13/336,321 filed Dec. 23, 2011, which claims the benefit of U.S. Provisional Application No. 61/427,002 filed on Dec. 23, 2010. The terms of these prior applications are incorporated by reference in their entirety.

BACKGROUND OF THE INVENTION

This application relates to hydrostatic transmissions generally and, in particular, to transmissions intended for use in driving a vehicle or other apparatus, such as a walk-behind leaf blower, snow thrower, brush cutter or various types of lawn mower.

SUMMARY OF THE INVENTION

An improved transmission assembly is disclosed herein, as described in more detail below. The transmission assembly may be mounted on a vehicle or other powered machine or apparatus, such as a leaf blower or lawn mower, for example, in various orientations to accommodate a variety of vehicle or equipment configurations.

A better understanding of the objects, advantages, features, properties and relationships of the invention will be obtained from the following detailed description and accompanying drawings which set forth illustrative embodiments that are indicative of the various ways in which the principles of the invention may be employed.

DETAILED DESCRIPTION OF THE DRAWINGS

Figure 1:
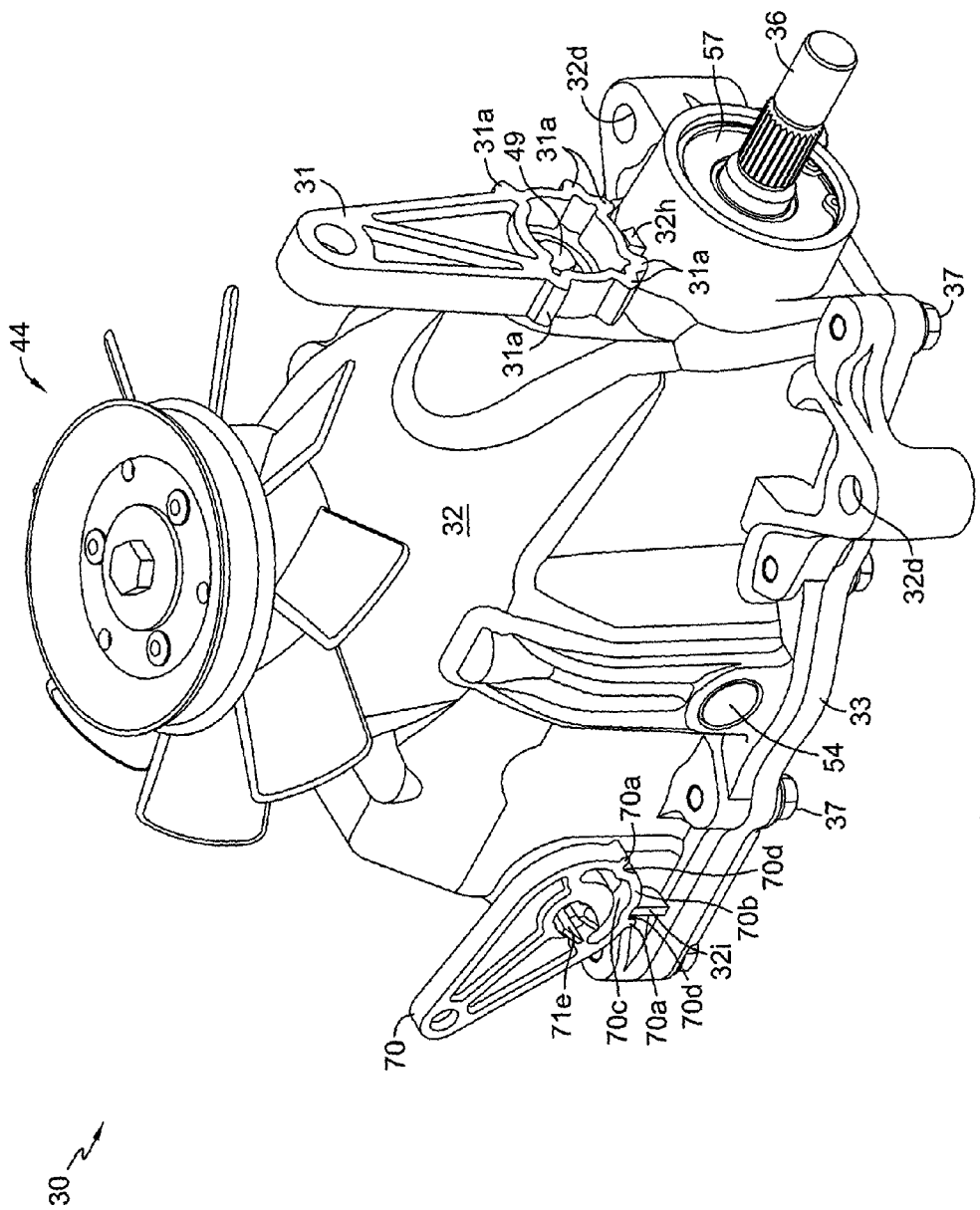
FIG. 1 is a perspective view of a transmission assembly in accordance with the present invention.

The description that follows describes, illustrates and exemplifies one or more embodiments of the present invention in accordance with its principles. This description is not provided to limit the invention to the embodiments described herein, but rather to explain and teach the principles of the invention in order to enable one of ordinary skill in the art to understand these principles and, with that understanding, be able to apply them to practice not only the embodiments described herein, but also other embodiments that may come to mind in accordance with these principles. The scope of the present invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. As stated above, the present specification is intended to be taken as a whole and interpreted in accordance with the principles of the present invention as taught herein and understood by one of ordinary skill in the art.

Referring to FIGS. 1-13, variable speed hydrostatic transmission assembly 30 generally comprises an input shaft 35 driving an axial piston pump assembly 40 rotatably disposed on a pump running surface 38a of a center section 38, the center section comprising hydraulic fluid ports and passages to hydraulically drive an axial piston motor assembly 42, the motor assembly 42 rotatably disposed on a motor running surface 38b of the center section 38 and driving an output shaft 36. The design of the axial piston pump and motor assemblies of transmission assembly 30, comprising pistons disposed in a rotatable cylinder block, are well-known in the art and will not be described in detail herein.

Hydrostatic transmissions of this type are described generally in, e.g., commonly-owned U.S. Pat. No. 5,314,387. A hydrostatic transaxle design used in a snow thrower is shown in commonly-owned U.S. Pat. No. 6,651,529. The terms of both of these patents are incorporated herein by reference.

The illustrated embodiment of transmission assembly 30 is a sealed unit which may be oriented in any position, depending on the vehicle or equipment configuration to which it is applied. However, for the purposes of this description, position and orientation terms such as top, bottom, upper, lower, vertical, horizontal, etc., will be applied to transmission assembly 30 as shown in FIG. 8 unless otherwise stated herein.

Figure 4:
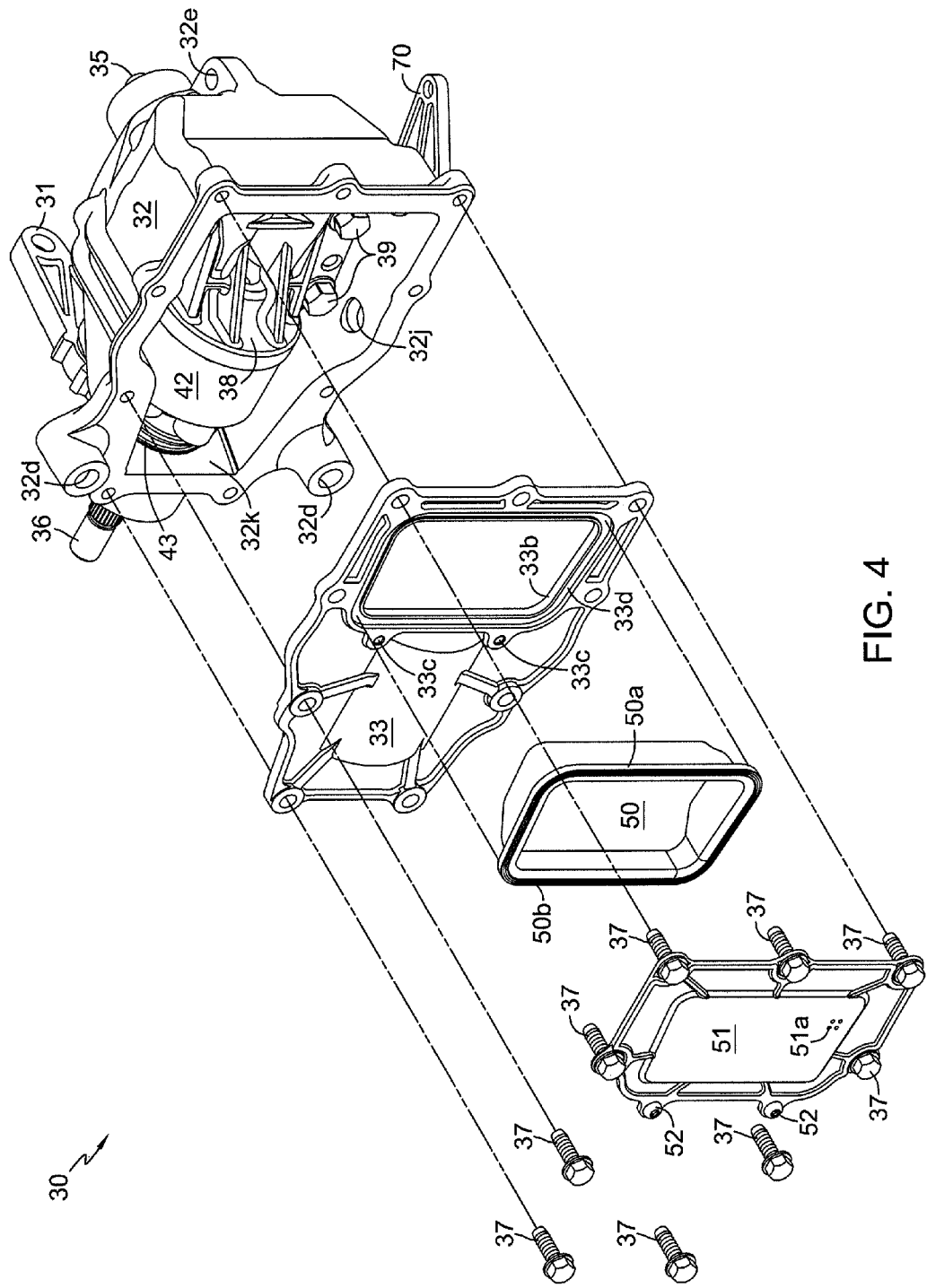
FIG. 4 is a partially exploded perspective view of the transmission assembly of FIG. 2.
Figure 8:
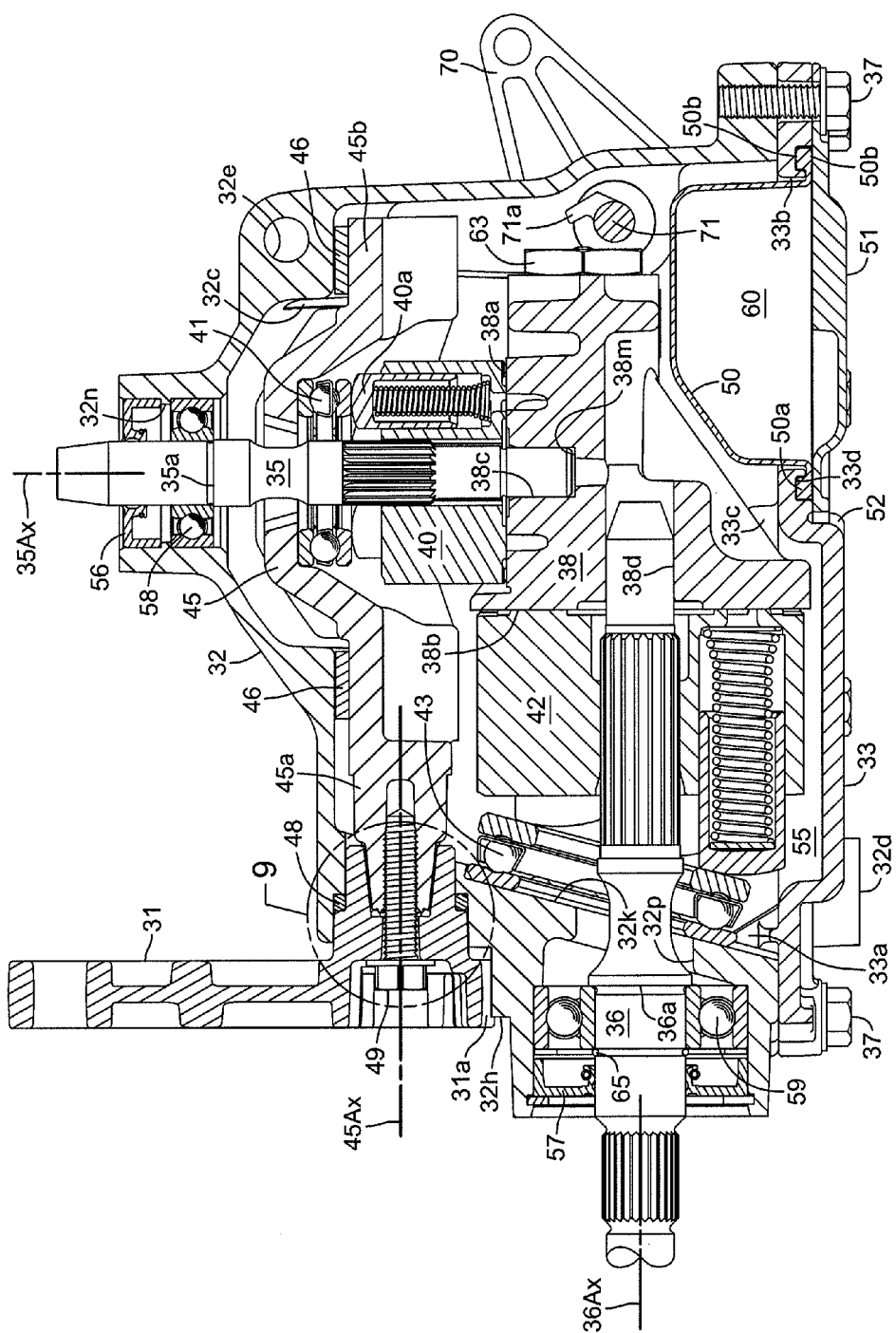
FIG. 8 is a cross-sectional view of the transmission assembly of FIG. 7 along line 8-8.
Figure 9:
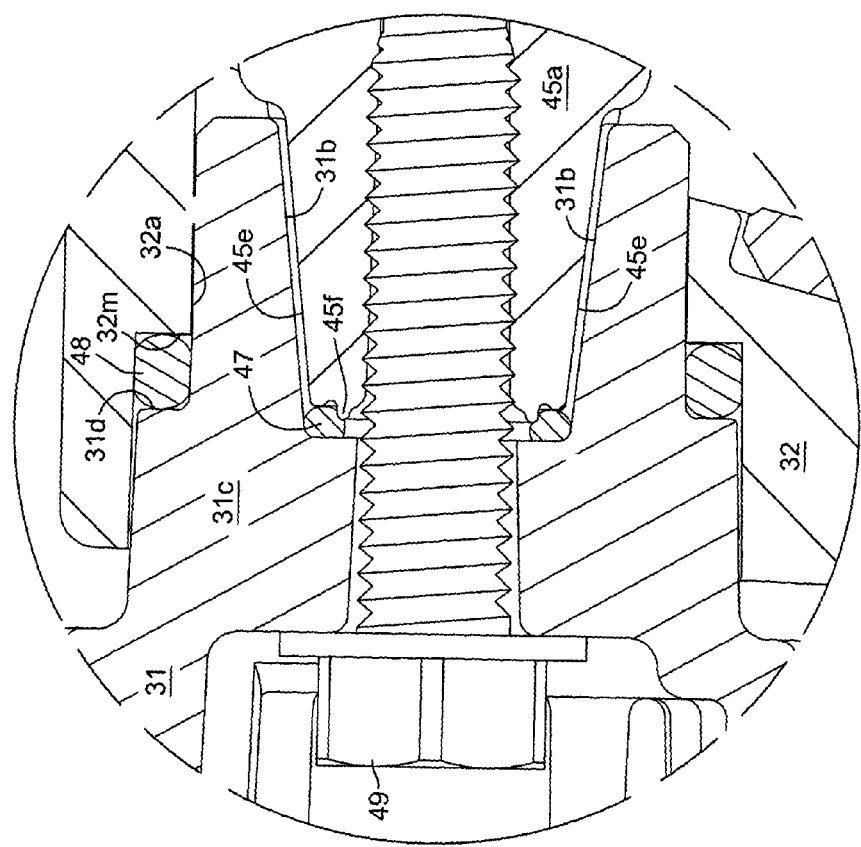
FIG. 9 is an enlarged detail view of the sealing interface between the swash plate trunnion shaft and the control arm as indicated by circle 9 of FIG. 8.
Figure 10:
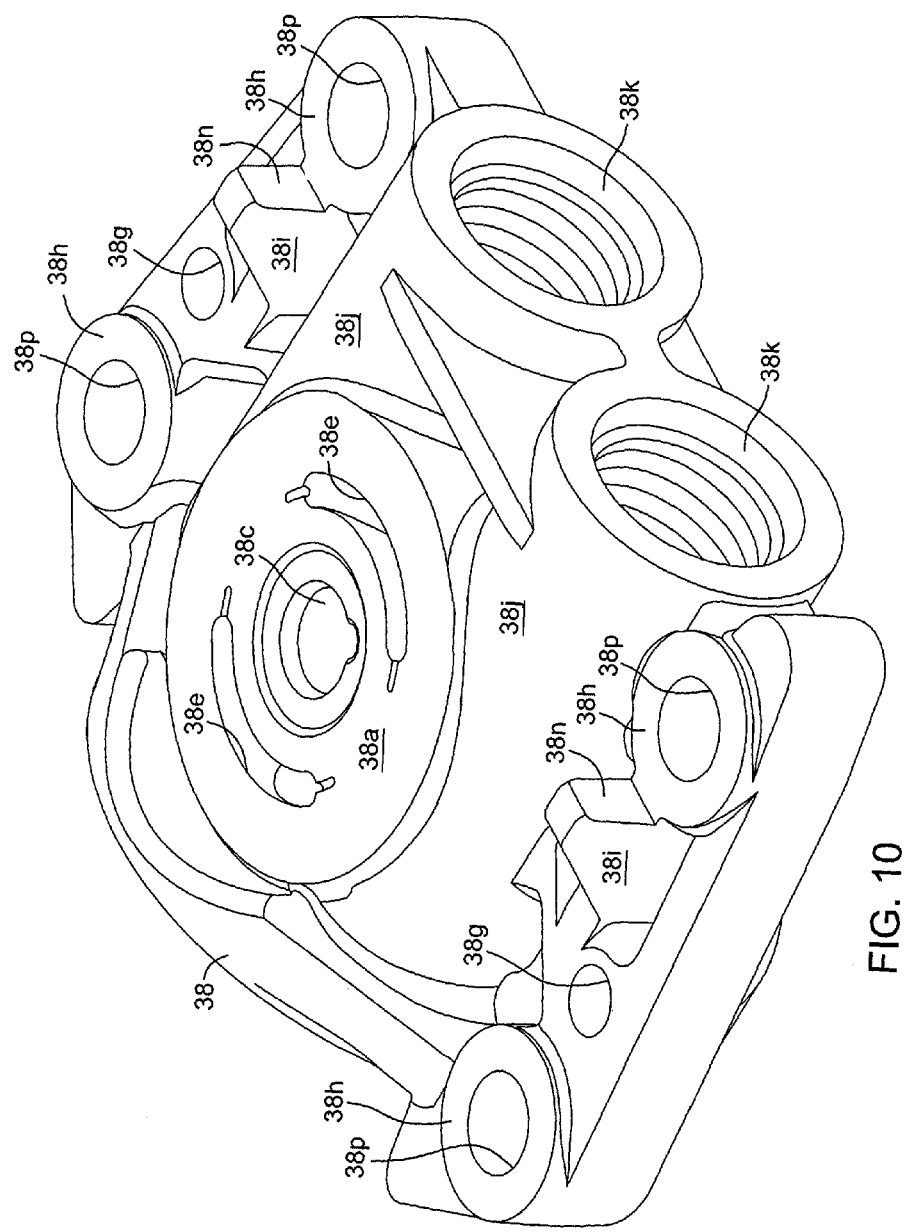
FIG. 10 is a perspective view of the center section of the transmission assembly of FIG. 1.
Figure 11:
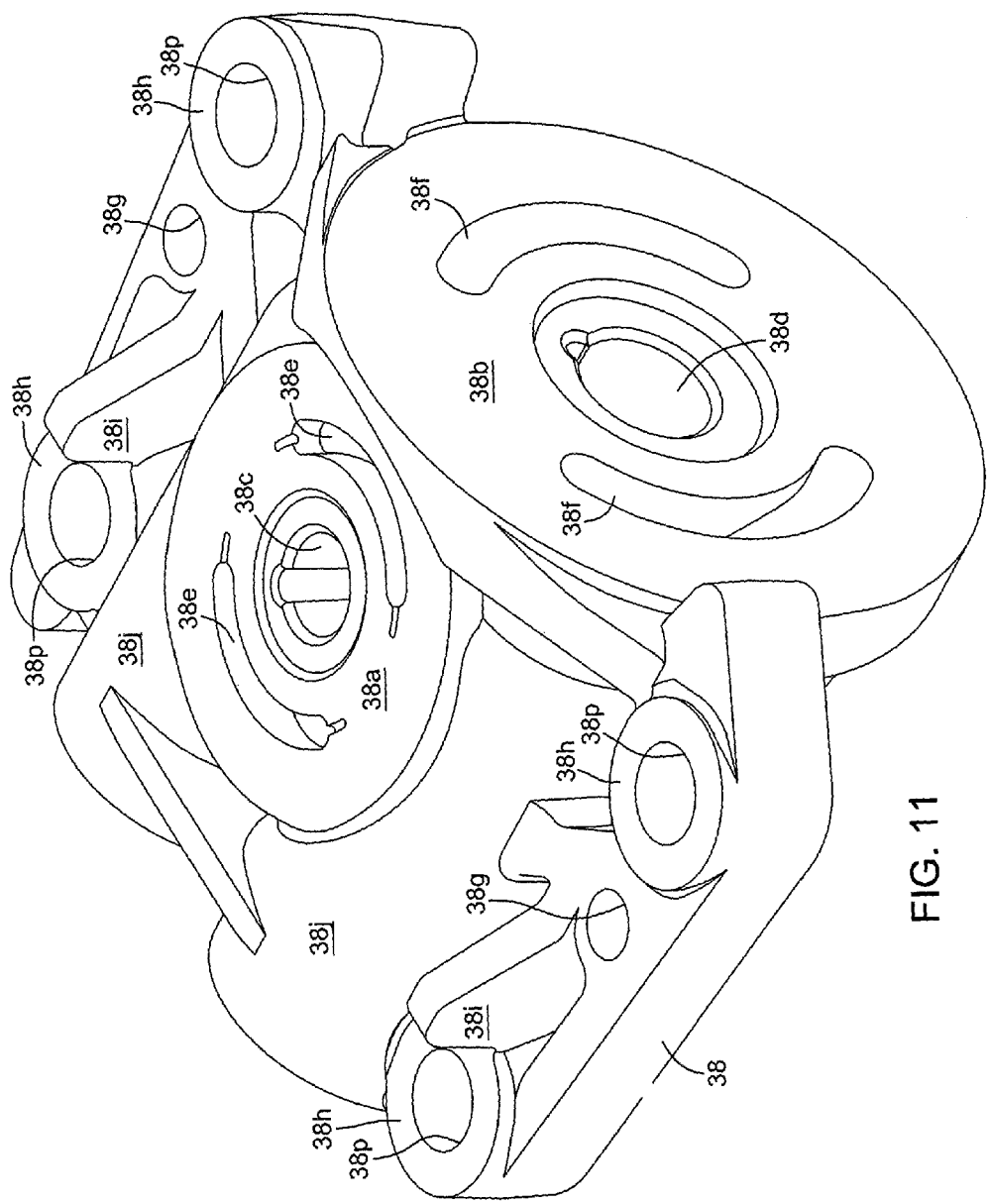
FIG. 11 is a perspective view of the center section of FIG. 10 rotated 180 degrees about the input shaft axis.
Figure 12:
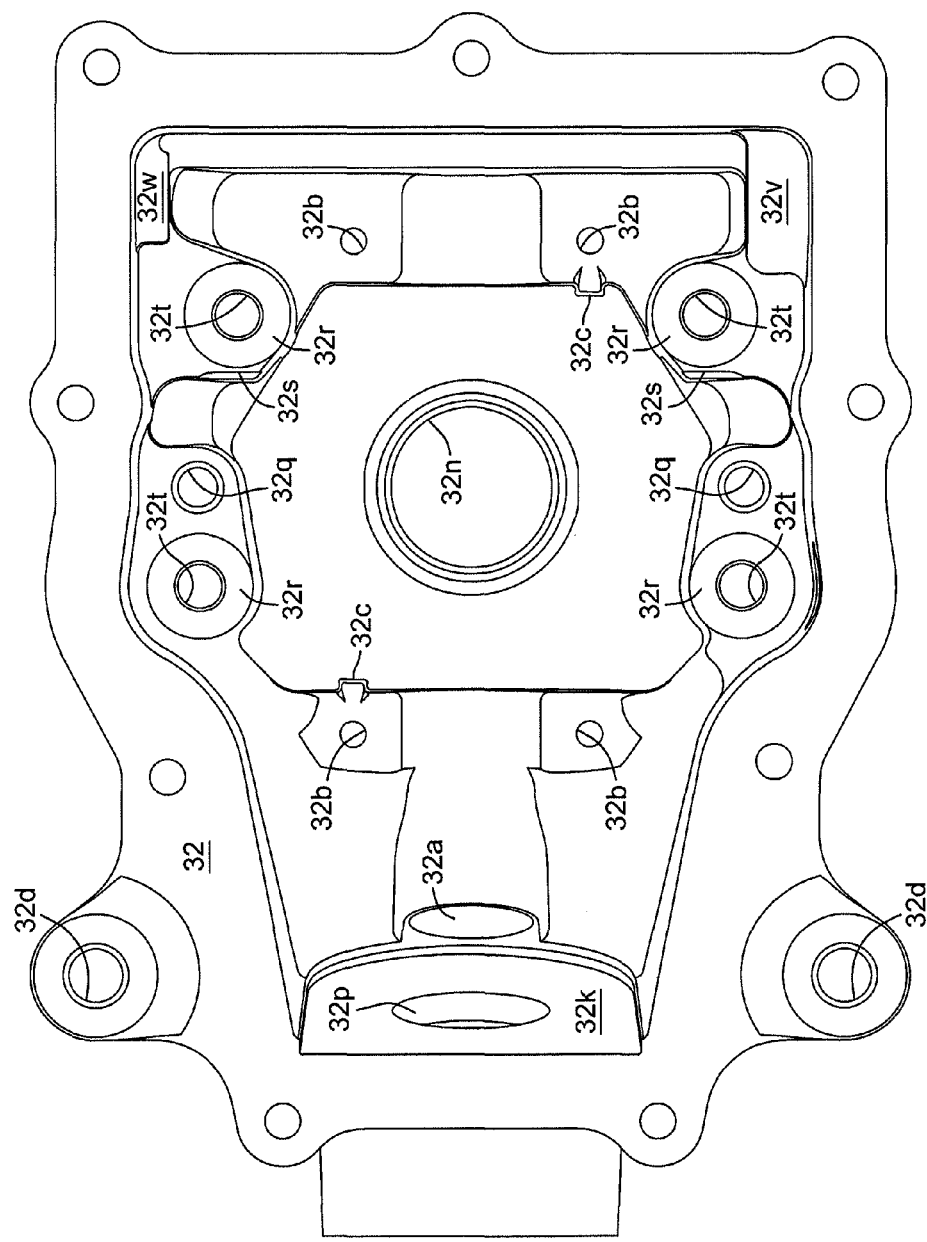
FIG. 12 is a bottom plan view of the main housing of the transmission assembly of FIG. 1.

Referring to FIGS. 4 and 8, transmission assembly 30 comprises internal sump 55 formed primarily by joining and sealing a main housing 32 and a housing cover plate 33 along a horizontal split line by means of a plurality of screws 37 (or other suitable fasteners) and known sealing methods, such as an adhesive-sealant or a gasket. Installation of an internal sump fluid expansion bladder 50 with bladder cover plate 51 further serves to form sump 55, as does the installation of various shaft seals such as input shaft seal 56, output shaft seal 57, trunnion shaft seal 47, control arm shaft seal 48 and bypass shaft seal 72. Bladder cover plate 51 includes one or more vent holes 51a to allow air to flow in and out of the pocket 60, formed by bladder 50 and bladder cover plate 51, as the fluid in sump 55 expands and contracts during the operating cycle of transmission assembly 30. An optional open cell structure foam block (not shown) may be installed in pocket 60, if needed, to help control the shape of the collapsing bladder 50 as the sump 55 fluid temperature rises.

As shown most clearly in FIGS. 4 and 8, expansion bladder 50 is inserted partially through opening 33b of cover plate 33 so that flange 50a of expansion bladder 50 fits into sealing groove 33d formed in cover plate 33 to create a seal around the perimeter of expansion bladder 50. Flange 50a is then trapped and retained when bladder cover plate 51 is installed. Both the upper and lower surfaces of flange 50a include a plurality of ribs and grooves 50b that run completely around the perimeter of sealing flange 50a to ensure sealing without the use of sealant. As shown, bladder cover plate 51 is installed with a portion of the screws 37 that are used to join housing cover plate 33 to main housing 32 and with additional screws 52 that engage sealed bosses 33c formed in housing cover plate 33.

Internal expansion bladder 50 allows expansion of sump 55 fluid within the sealed transmission assembly 30 without the need for a vent to atmosphere or an external expansion tank with associated fittings, etc., while enabling the versatility of orienting transmission assembly 30 in any operating position desired based upon the vehicle or equipment configuration to which transmission assembly 30 is to be applied. However, as is known in the art, check plugs, such as check plugs 63 of transmission assembly 30, must remain submerged in sump 55 fluid at all times during operation of transmission assembly 30. If transmission assembly 30 is installed in an orientation with the output shaft 36 pointing downward such that check plugs 63 are oriented at the upward end of the installed transmission assembly 30 (i.e., if transmission assembly 30 as shown in FIG. 8 is rotated approximately 90 degrees counter-clockwise and installed in a vehicle, for example), then substantially complete filling of sump 55 with fluid and purging of air from the internal volume of transmission assembly 30 must be ensured during the manufacturing process. If it is deemed by a manufacturer of transmission assembly 30 to be impractical to reliably ensure proper fluid fill level at a cost and confidence level acceptable to that manufacturer, then modification of main housing 32 to increase the internal volume of main housing 32 and the sump 55 fluid volume in the vicinity of the check plugs 63 could be deemed desirable or necessary in order to avoid placing restrictions on the installed orientation of transmission assembly 30. Also, fluid expansion bladder 50 could be relocated to the end of main housing 32 that is proximate to check plugs 63. After sump 55 of transmission assembly 30 is properly filled with an appropriate transmission fluid, a plug 54 is installed in fluid fill opening 32j of main housing 32 to complete the formation and sealing of sump 55. Plug 54 may be a threaded plug or a push-in rubber or elastomeric plug, for example. Plug 54 may be positioned in housing 32 in a location other than that shown herein, if desired.

Figure 5:
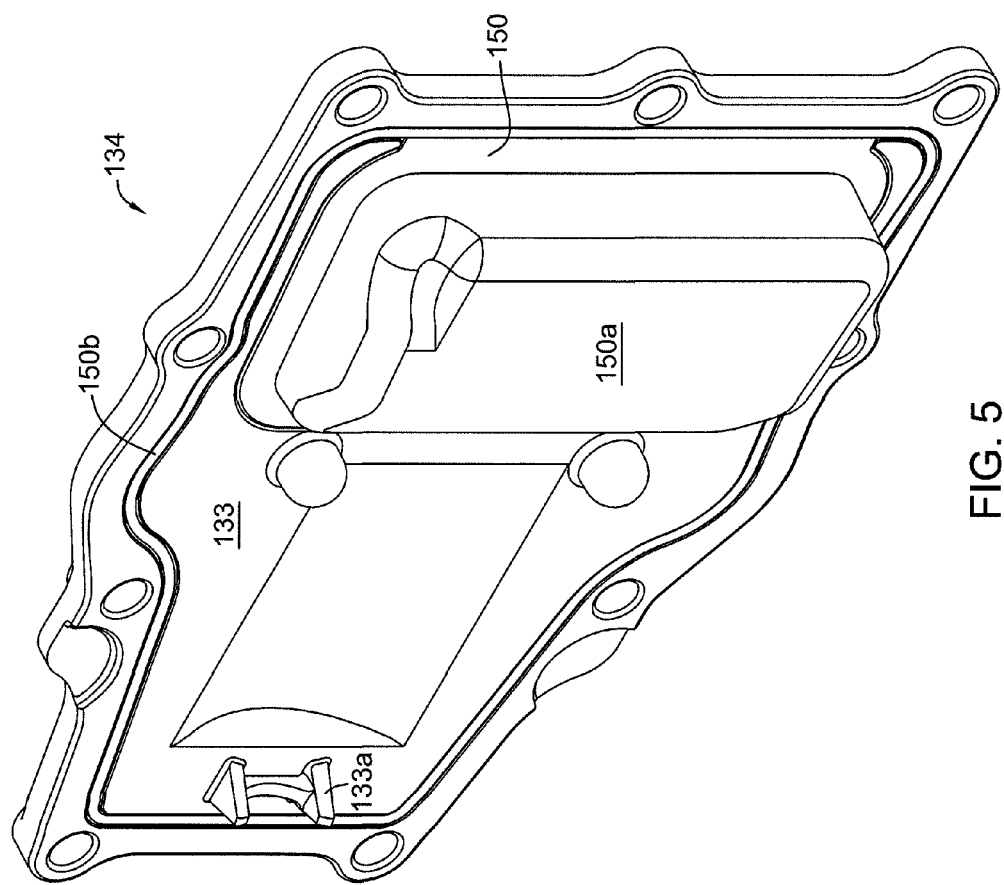
FIG. 5 is a perspective view of an alternative housing cover plate.

As an alternative, housing cover plate 134, as shown in FIG. 5, replaces housing cover plate 33 and internal expansion bladder 50 of transmission assembly 30. Housing cover plate 134 includes a plate component 133 and an integral, over-molded bladder-gasket 150 comprising an expansion bladder component 150a and a gasket component 150b. Alternatively, expansion bladder component 150a and gasket component 150b need not be over-molded onto plate component 133 at the same time or joined together as shown, but rather can be over-molded separately onto plate component 133 and may each be formed with different material properties to achieve desired flexibility, sealing characteristics, etc.

Figure 22:
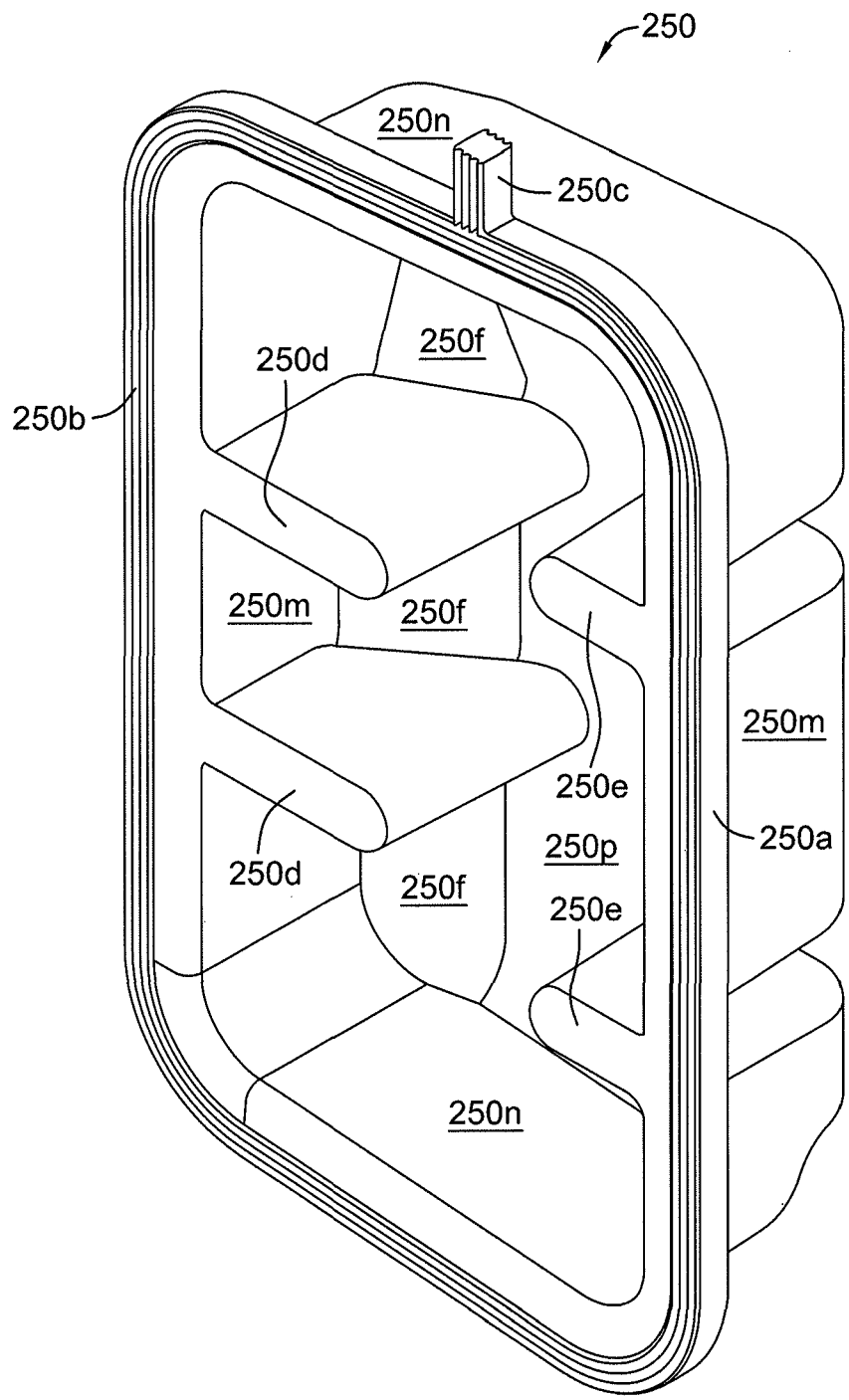
FIG. 22 is a perspective view of an alternative expansion bladder.
Figure 23:
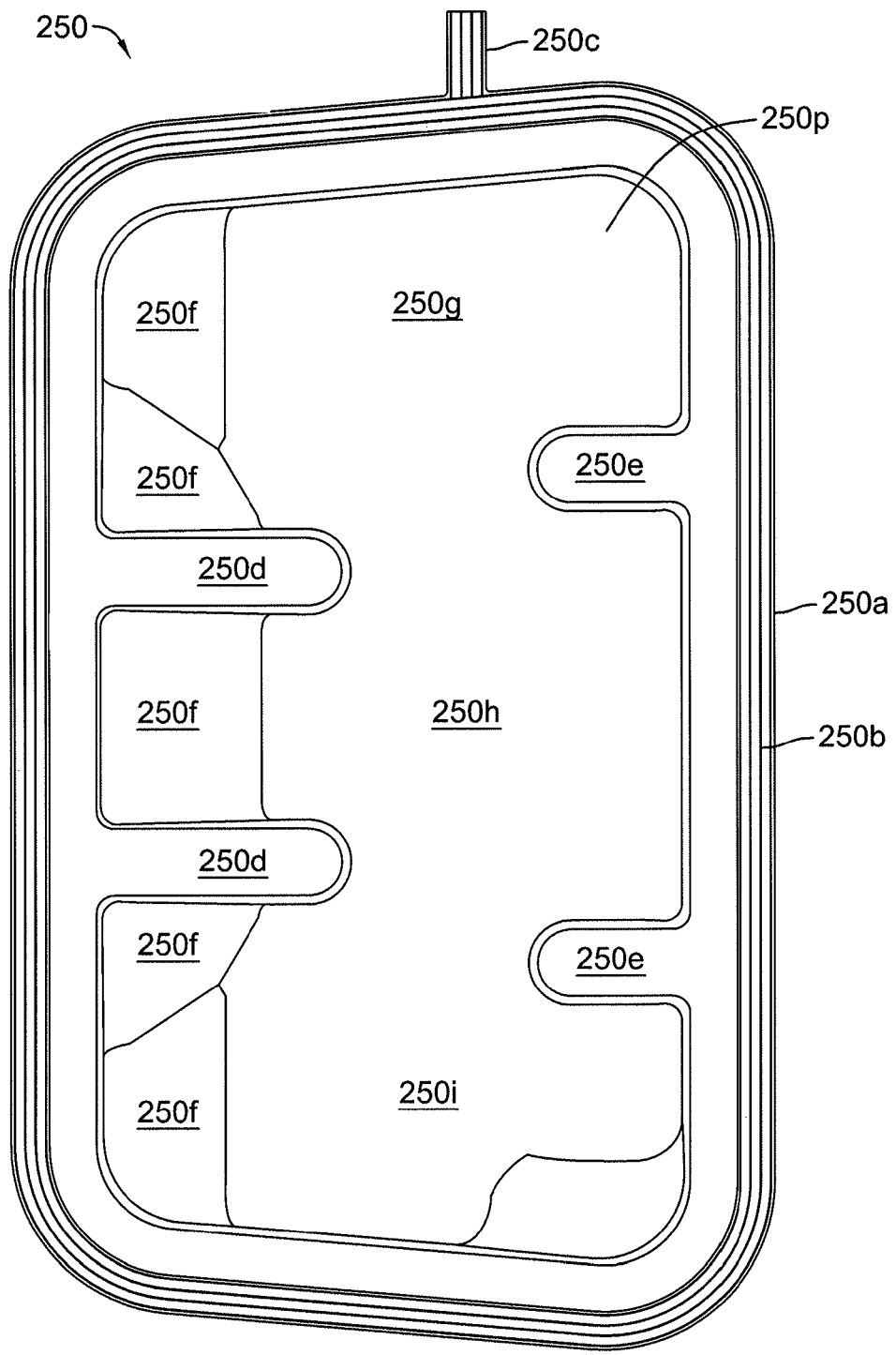
FIG. 23 is a bottom plan view of the bladder shown in FIG. 22.

Bladder 250 as shown in FIGS. 22 and 23 is an alternative design that can be used in place of bladder 50 as described above, and flange 250a operates similarly to flange 50a previously described for mounting bladder 250 to the housing. Bladder 250 has an approximately rectangular shape with two longer sidewalls 250m and two shorter sidewalls 250n adjacent to surfaces 250p and 250f to bound an internal volume, in cooperation with a plate such as bladder cover plate 51. Two pairs of stiffening ribs 250d and 250e extend into this internal volume of bladder 250 perpendicularly from longer side walls 250m, running along the respective longer sidewalls 250m from flange 250a to top surface 250p. These ribs 250d, 250e assist not only in strengthening the body of bladder 250 to prevent unwanted collapse, but also to improve its ability to collapse in a controlled manner as the oil expands. Ribs 250d are preferably longer than ribs 250e, and it has been determined that the placement of the two longer ribs 250d on one longer sidewall 250m and the other two shorter ribs 250e on the opposite longer sidewall 250m improves the ability of bladder 250 to collapse appropriately. The location of the two longer ribs 250d between the two shorter ribs 250e, as depicted in FIGS. 22 and 23, creates three separate zones 250g, 250h and 250i in the internal volume of bladder 250 for sidewalls 250m, 250n to collapse in on themselves. A beveled surface 250f is provided on one sidewall 250m primarily for clearance so that bladder 250 fits within the housing 32, but this beveled surface 250f also improves the ability of bladder 250 to collapse appropriately. Bladder 250 may be composed of various materials but is preferably a rubber compound. Tab 250c ensures proper placement of bladder 250 in a transmission assembly.

When housing cover plate 33 or alternate housing cover plate 134 is installed onto main housing 32, an integrally-formed bearing support structure 33a or integrally-formed bearing support structure 133a, respectively, cooperates with a thrust bearing positioning recess 32k formed in main housing 32 to properly position motor thrust bearing 43. It will be understood that housing cover plate 33 or alternate housing cover plate 143 may use protrusions (not shown) which mate with and engage openings (not shown) in main housing 32 to aid assembly by ensuring proper placement of the housing cover plate 33 or 143.

As is evident upon examination of FIGS. 4, 6, 8 and 13, transmission assembly 30 can be assembled without rotating main housing 32 about more than one axis during assembly. All mechanical components of transmission assembly 30 can be assembled into main housing 32 prior to attaching housing cover plate 33. All mechanical components and, in particular, all rotating shaft bearings and/or bearing surfaces are located within main housing 32. This design and arrangement of all rotating components within or at least partially supported by a single housing component allows all critical housing machining to occur within only one housing component (main housing 32) so that critical alignment of bearing surfaces located in separate housing components is not required in the manufacture of transmission assembly 30.

Referring primarily to FIGS. 1, 3, 6, 8, 9 and 12, the speed and direction of the output shaft 36 of transmission assembly 30 is controlled by rotating a control arm 31 engaged to trunnion shaft 45a of trunnion-mounted swash plate 45 to move swash plate 45 in an arcuate manner along the axis of rotation of trunnion shaft 45a. Swash plate 45 is engaged to pump pistons 40a in a known manner. The allowed rotation angle of control arm 31 is limited by contact between stops 31a formed on control arm 31 with protrusion 32h formed on main housing 32. In the illustrated embodiment, three pairs of stops 31a are positioned on control arm 31 such that control arm 31 can be attached in one of three orientations to trunnion shaft 45a, as permitted by the arrangement of stops 31a and the engagement of four tapered ribs 31b, formed on shaft 31c of control arm 31, with four tapered recesses 45e formed on a distal end of trunnion shaft 45a. As shown most clearly in FIG. 6, recesses 45e and ribs 31b are generally rectangular in shape.

In order to install swash plate 45, swash plate 45 is tilted and then moved into position inside housing 32 so that trunnion shaft 45a enters bore 32a as swash plate 45 is placed against cradle bearings 46 and is also positioned between the two locating thrust ribs 32c formed in housing 32. Then, control arm 31 can be oriented to the desired mounting position and installed, along with seal 47 and seal 48, by means of screw 49. Control arm 31 can have one or more leak indicator grooves (not shown) to aid assembly by ensuring proper installation of seal 47 and seal 48. As screw 49 is tightened, ribs 31b engage recesses 45e and a concentric ridge 45f formed on the end of trunnion shaft 45a is pressed against trunnion shaft seal 47 while the control arm shaft seal 48 is trapped between shoulder 31d formed on control arm shaft 31c and shoulder 32m formed on main housing 32. Control arm shaft seal 48 may be omitted and a press-fit lip-seal (not shown) can be used in lieu thereof.

Figure 19:
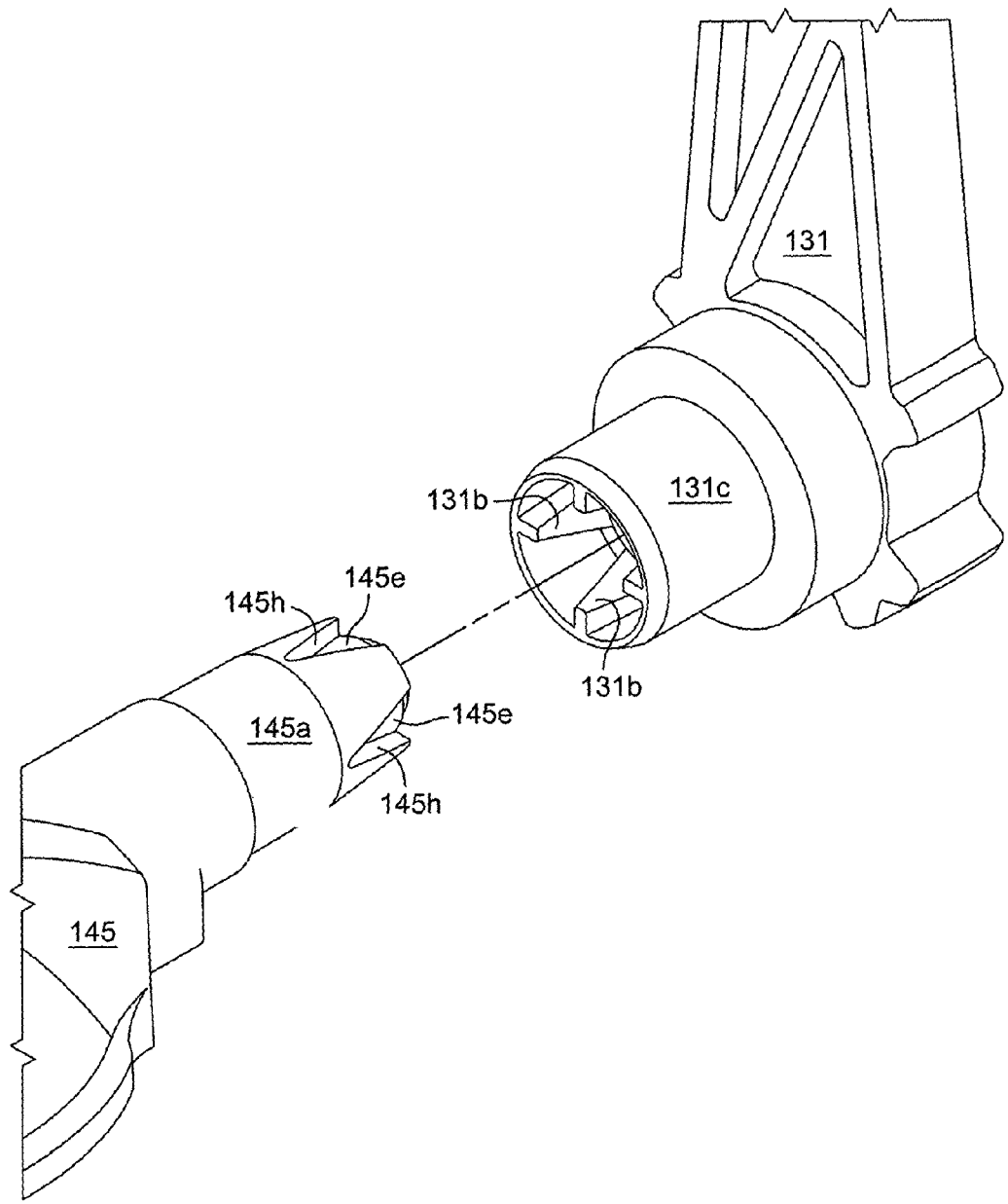
FIG. 19 is a partial, exploded perspective view of an alternative trunnion shaft and control arm assembly.
Figure 20:
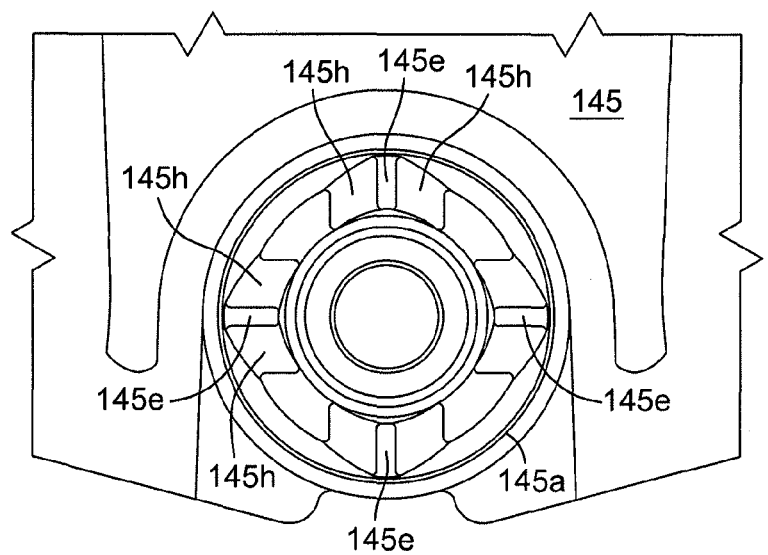
FIG. 20 is a partial, side plan view of the trunnion shaft shown in FIG. 19.
Figure 21:
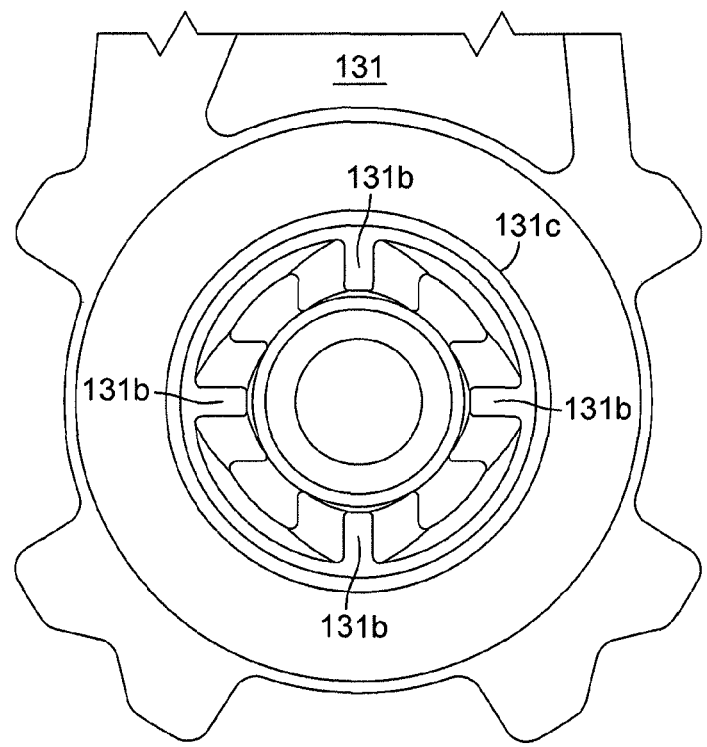
FIG. 21 is a partial, side plan view of the control arm shown in FIG. 19.

FIGS. 19, 20, and 21 show a portion of an alternative trunnion shaft and control arm assembly. Trunnion shaft 145a has a plurality of tapered recesses 145e formed about its circumference, and which engage tapered ribs 131b of control arm shaft 131c. In this embodiment, recesses 145e have a pair of side walls 145h which meet so that tapered recesses 145e are generally triangular in shape; similarly, tapered ribs 131b each have a similar shape to fit within each tapered recess 145e. The shapes and relationships of tapered recesses 145e and tapered ribs 131b as shown balance calculated force vectors to minimize the creation of radial force by trunnion shaft 145a in the vicinity of tapered recesses 145e. Tapered recesses 145e, along with tapered ribs 131b, can be clocked (e.g. by 45°) to aid assembly by facilitating installation of swash plate 145 into main housing 32. It should be understood that various features of the alternative embodiments of components described herein that do not cooperate with or affect the essential operation of one another can be used together or separately. For example, swash plate 145 and control arm 131 can be used with rotary bypass mechanism 69 and, likewise, swash plate 45 and control arm 31 can be used with bypass arm 170 and bypass shaft 171, described below.

Specialized cradle bearings 46 comprising integrally-formed locator pins 46a that engage pin receptacles 32b formed in main housing 32, are supportively positioned above trunnion shaft 45a and trunnion protrusion 45b to allow arcuate movement of swash plate 45. Swash plate 45 is further supported by the spring forces applied by pump assembly 40 against pump thrust bearing 41 that is installed in a positioning recess formed in swash plate 45, as shown in FIG. 8. Swash plate 45 is further supported through its previously described attachment to control arm shaft 31c that is integrally formed as part of control arm 31 and is rotatably supported in bore 32a formed in main housing 32. Excessive axial movement of swash plate 45 is prevented by its location between two thrust ribs 32c that each interface with a cam-like surface 45g that is formed with a curvature to interface with the drafted surface of each rib 32c as swash plate 45 is arcuately moved through its full range of motion. These interfacing surfaces are formed such that the interface of a cam-like surface 45g with a corresponding drafted surface of a rib 32c does not cause any significant axial movement of swash plate 45. The two thrust ribs 32c are spaced apart such that only one rib 32c can be in contact with one cam-like surface 45g at any given time, thereby allowing free arcuate movement of swash plate 45 while limiting the axial movement of swash plate 45. While two ribs 32c are depicted, it will be appreciated by those skilled in the art that four ribs could be used such that only two of such ribs can be in contact with one cam-like surface 45g at any given time.

Figure 3:
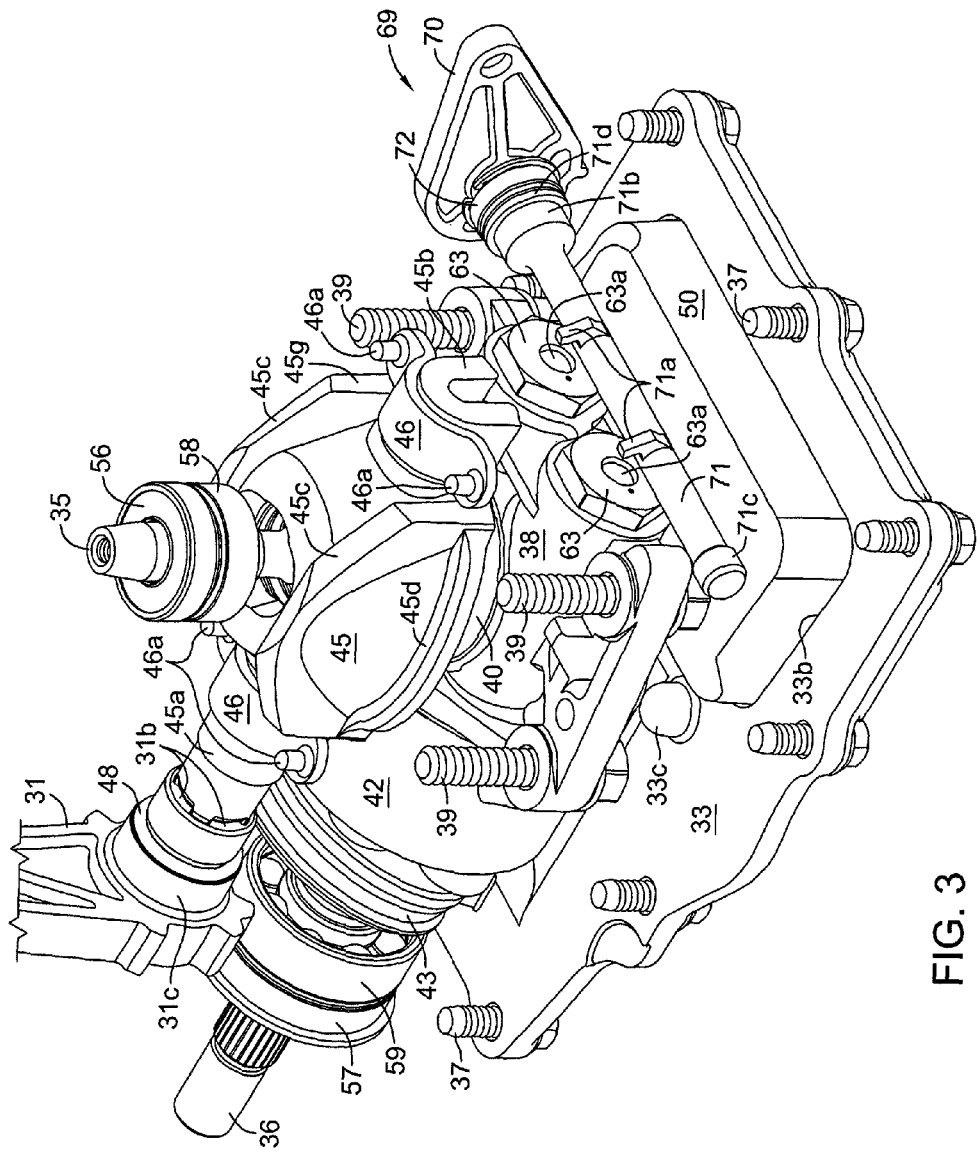
FIG. 3 is a perspective view of the transmission assembly of FIG. 2 with the main housing removed.

Positioning of specialized cradle bearings 46 on the trunnion shaft 45a and trunnion protrusion 45b allows structural arch ribs 45c and structural skirting ribs 45d to be integrally formed on the symmetrical swash plate 45 so that it is strengthened to a level that enables fabrication of swash plate 45 as an as-cast component with no machining requirement prior to installation in transmission assembly 30. As seen in FIG. 3, skirting ribs 45d extend in a direction generally perpendicular (e.g., within about 15°) to the direction of arch ribs 45c.

Referring primarily to FIGS. 1, 3, 6, 8 and 10, a rotary bypass mechanism 69 comprising a bypass arm 70 and a bypass shaft 71 is provided to allow a vehicle or equipment operator to selectively disconnect the hydraulic fluid circuit of transmission assembly 30 by unseating the check balls 63a of check plugs 63 that are installed in ports 38k formed in the ends of fluid passage tubes 38j of center section 38. If hydraulic pressure alone is used to bias the check balls 63a to the seated position shown in FIG. 3, the longitudinal axis of check plugs 63 should be horizontal so that gravity will not unseat check balls 63a. Check plugs of the type shown and described herein are also known as check valves and well known in the art and will not be described in greater detail herein.

Bypass arm 70, which can be composed of a plastic material, comprises two stops 70a, each serving as a boundary at opposite ends of a flexible arch 70b that is formed adjacent to a material void or opening 70c formed in bypass arm 70, with the material void or opening 70c allowing arch 70b to flex as will be further described. Bypass arm 70 also includes two recesses 70d, with one recess 70d located at each end of the flexible arch 70b and therefore adjacent to each of the two stops 70a. This arrangement of features provides a detent function at each end of flexible arch 70b. When bypass arm 70 is positioned in a first detent position, as shown most clearly in FIGS. 1 and 3, fingers 71a formed on shaft 71 are not in contact with the check balls 63a of check plugs 63. As the bypass arm is pivoted, flexible arch 70b wipes against projection 32i formed on housing 32, providing rotational resistance of shaft 71. When this rotational resistance is overcome, bypass arm 70 is rotated to a second detent position in which the two fingers 71a formed on shaft 71 simultaneously unseat the two check balls 63a of the two check plugs 63. In each of the two detent positions, projection 32i is seated in a recess 70d. This configuration enables the use of a very simple push-pull linkage or cable mechanism, or even rotation of bypass arm 70 by hand (if bypass arm 70 is easily accessible and its rotational resistance is not too great) to engage and disengage the bypass function.

Figure 6:
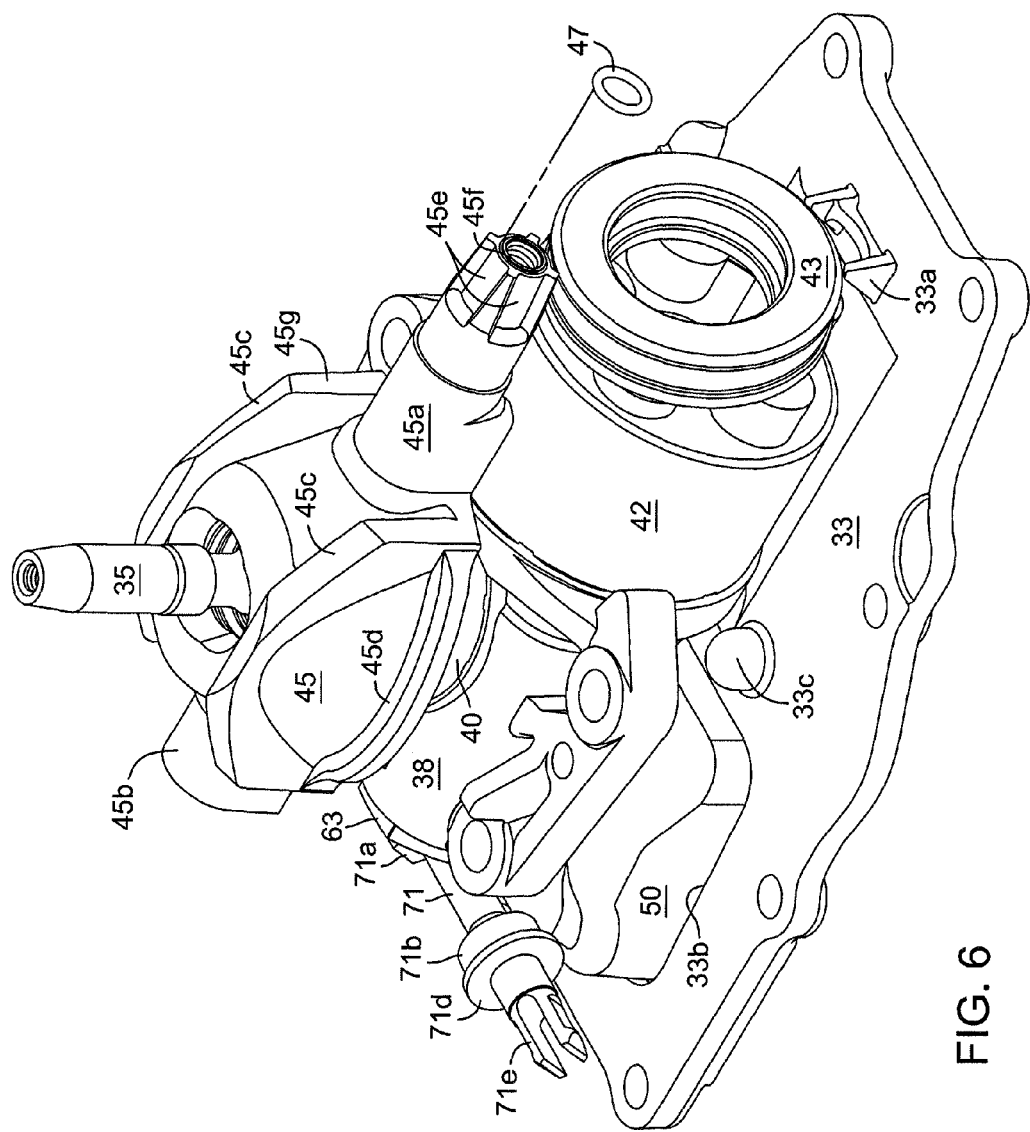
FIG. 6 is a perspective view of the transmission assembly of FIG. 1 with the main housing and various other components removed for clarity.

As can be seen in FIGS. 1 and 6, the bypass arm 70 can be easily installed onto bypass shaft 71 by pressing it into position so that it is retained on shaft 71 by a snap fit end 71e formed on shaft 71. Similarly, bypass arm 70 can be removed from bypass shaft 71 by pinching the snap fit end 71e while pulling the bypass arm away from main housing 32 along the rotational axis of bypass shaft 71.

Figure 13:
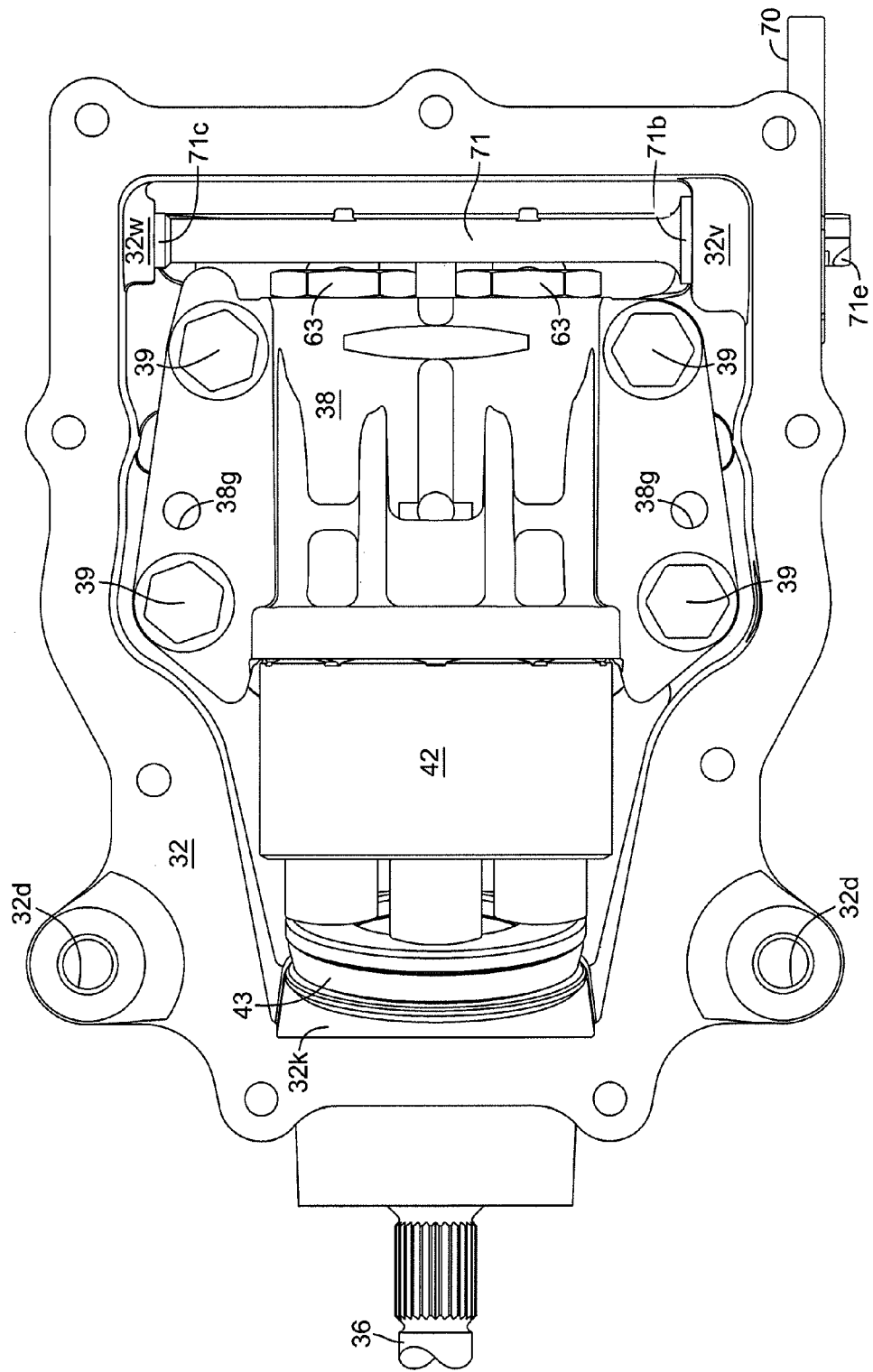
FIG. 13 is a bottom plan view of the transmission assembly of FIG. 1 with the housing cover plate removed.

As shown in FIGS. 1, 3 and 13, the bypass shaft 71 also comprises integrally formed bearing surfaces 71b and 71c that are supported, respectively, in an opening and a recess formed in shaft supports 32v and 32w that are formed on opposing sides of main housing 32. A seal abutment flange 71d formed on bypass shaft 71 ensures limited outward movement along the rotational axis of bypass shaft 71 because of its location adjacent to the bypass shaft seal 72.

Figure 17:
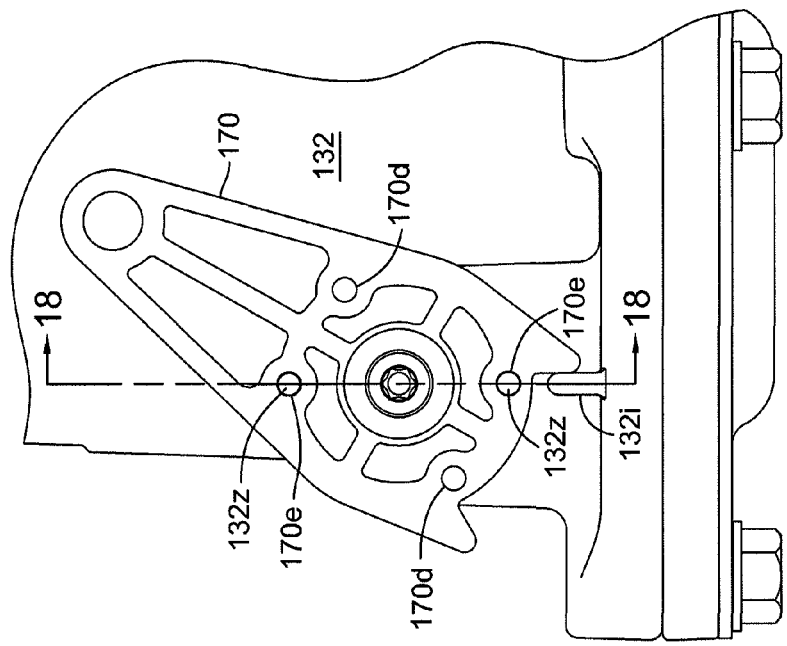
FIG. 17 is a side plan view identical to FIG. 16, except with the bypass mechanism engaged.
Figure 16:
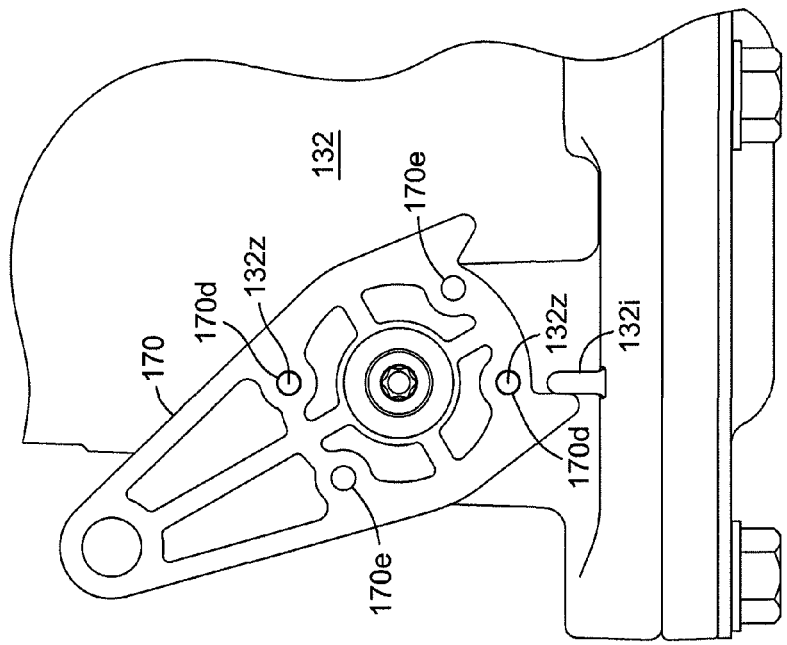
FIG. 16 is a side plan view of a portion of an alternative bypass arm mechanism.
Figure 18:
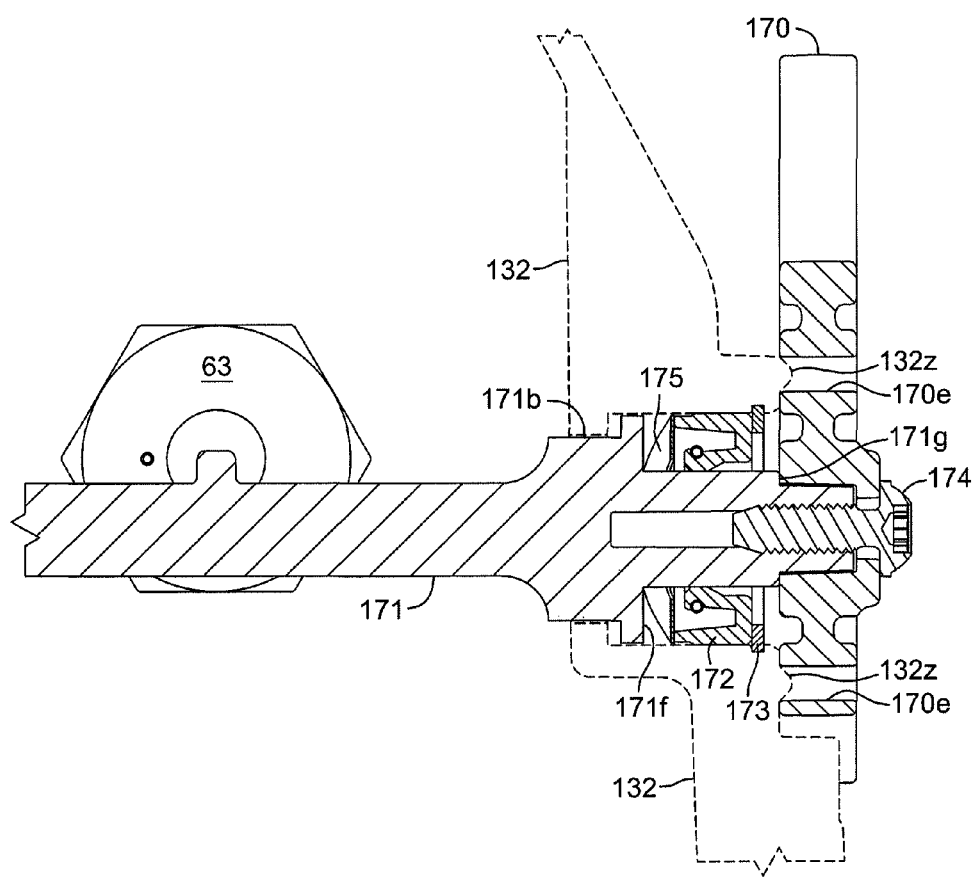
FIG. 18 is a cross-sectional view of the bypass arm mechanism taken along line 18-18 of FIG. 17 with the housing shown in phantom.

FIGS. 16, 17, and 18 show a portion of an alternative embodiment of the bypass arm mechanism. Bypass arm 170, which can be composed of a plastic material, has two pairs of detent openings, 170d and 170e, which mate with and alternately engage detents 132z. When bypass arm 170 is positioned in a first detent position as shown in FIG. 16, detents 132z engage detent openings 170d. When bypass arm 170 is manipulated by pivoting bypass arm 170 to a second detent position as shown in FIG. 17, detents 132z engage detent openings 170e. Protrusion 132i stops the pivoting of bypass arm 170 when the second detent position is reached.

Referring to FIG. 18, manipulating bypass arm 170 causes bypass shaft 171 to rotate because bypass arm 170 is fixed to bypass shaft 171 by fastener 174. Shoulder 171g contacts bypass arm 170 to position same. Wave spring 175 bears against flange 171f and bypass shaft seal 172, which are all retained by retaining ring 173. The force of wave spring 175 against flange 171f and seating of detents 132z in the pairs of detent openings 170d and 170e provides resistance of bypass shaft 171 to rotation. Bypass shaft 171 is partially supported by contact of bearing surface 171b with main housing 132. Bypass shaft 171 is also partially supported by contact with main housing 132 of a bearing surface (not shown) of bypass shaft 171 corresponding to bearing surface 71c of bypass shaft 71.

Figure 7:
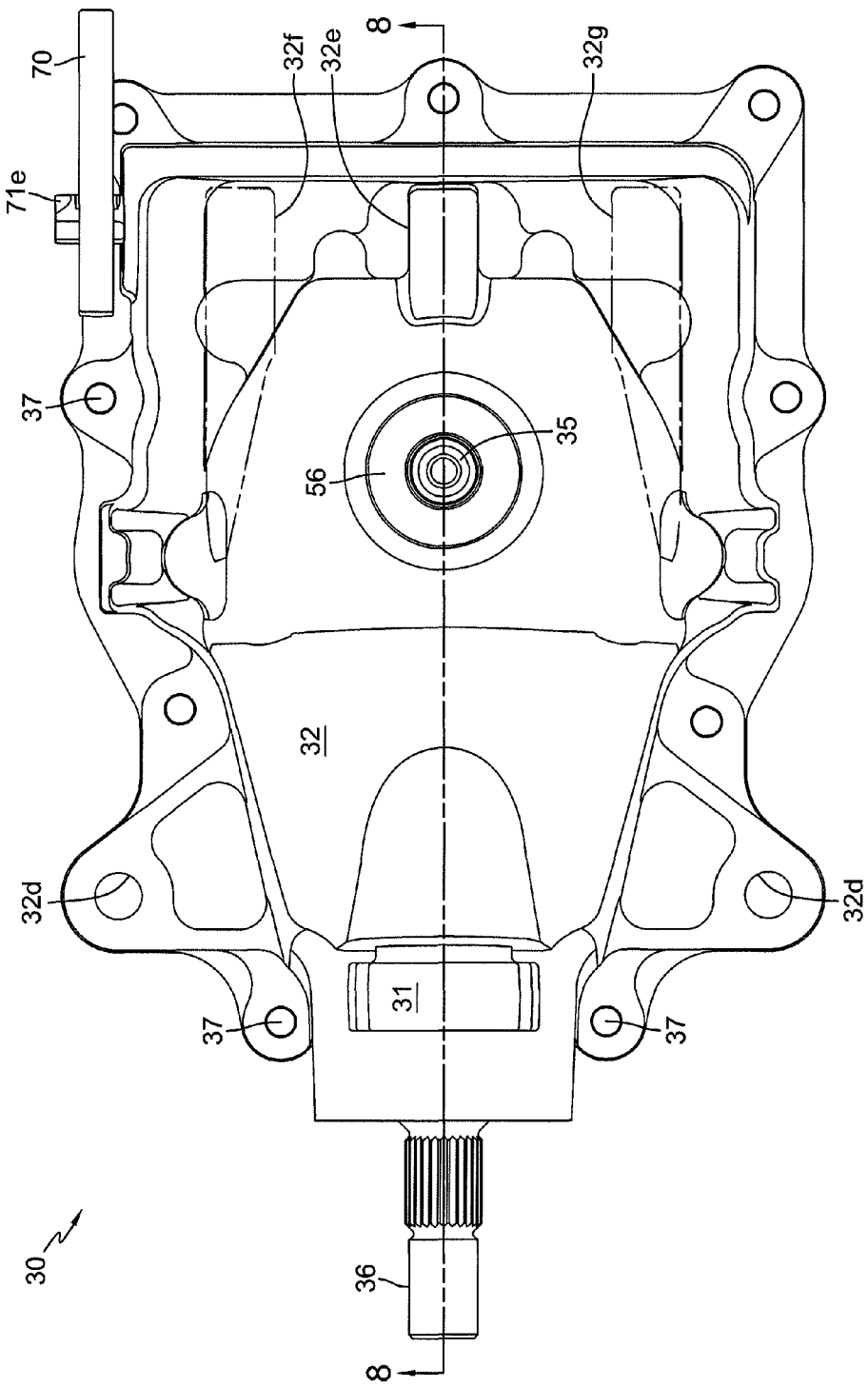
FIG. 7 is a top plan view of the transmission assembly of FIG. 2 with alternative or additional structure shown in phantom.

As can be seen most clearly in FIGS. 7 and 8, the rotational axis 35Ax of input shaft 35, the rotational axis 36Ax of output shaft 36, and the rotational axis 45Ax of trunnion shaft 45a that is integrally formed as part of swash plate 45 all lie on a single vertical plane with one end of both the input shaft 35 and output shaft 36 supported in center section 38 and the opposite end supported in main housing 32. The components of the hydraulic circuit are all arranged symmetrically about the plane on which these three axes are located, resulting in a substantially symmetrical main housing 32 and transmission assembly 30. With a few obvious and relatively minor modifications, transmission assembly 30 can be configured symmetrically in its entirety about the vertical plane represented by line 8-8 of FIG. 7. It will be understood that this plane need not be vertical with respect to ground as transmission assembly 30 may be mounted in different configurations such as is shown in vehicle 10 of FIG. 14, where the plane would be horizontal with respect to ground, as compared to vehicle 80 of FIG. 15 where the plane would be vertical.

Referring primarily to FIGS. 7, 8, 10, 11 and 12, vertical input shaft 35 passes through opening 32n of main housing 32 and is supported by a bearing 58 and by a journal opening 38c formed in center section 38. Vertical input shaft 35 is drivingly engaged to the axial piston pump assembly 40 that is rotatably disposed on pump running surface 38a of center section 38. The horizontal output shaft 36 passes through opening 32p of housing 32 and is supported by a bearing 59 and by a journal opening 38d formed in center section 38. Horizontal output shaft 36 is drivingly engaged to the axial piston motor assembly 42 that is rotatably disposed on motor running surface 38b of center section 38. Vertical input shaft 35 is restrained from excessive axial movement in one direction by shoulder 35a formed on shaft 35 and in the opposite direction by center section 38 thrust surface 38m. In this manner, input shaft 35 is trapped in position during assembly without using additional parts, such as retaining rings, for example. Similarly, output shaft 36 is restrained from excessive axial movement in one direction by shoulder 36a formed on shaft 35 and in the opposite direction by a simple wire retaining ring 65 or other similar retaining ring.

Referring primarily to FIGS. 8 and 10-13, center section 38 includes hydraulic porting and passages for hydraulically connecting pump assembly 40 and motor assembly 42. Pump running surface 38a comprises two kidney-shaped hydraulic fluid ports 38e and motor running surface 38b comprises two kidney-shaped hydraulic fluid ports 38f. Two check plug ports 38k are provided in the ends of the two substantially parallel fluid passage tubes 38j to receive the two check plug assemblies 63. The fluid passage tubes 38j provide fluid communication between pump running surface 38a and motor running surface 38b.

Precision installation of center section 38 is accomplished by employing a combination of design elements and installation techniques. Assembly tools (not shown) comprising pin locators (not shown) accurately position the center section 38 in main housing 32 by simultaneously engaging two machined openings 38g formed in center section 38 and two axially aligned machined recesses 32q formed in main housing 32 while installing the four center section attachment screws 39 through four machined openings 38p formed in center section 38 and into engagement with four machined recesses 32t formed in main housing 32. Machined surfaces 38n formed on two alignment protrusions 38i integrally formed on center section 38 interface with two machined vertical surfaces 32s formed in main housing 32 to further ensure proper alignment of center section 38. Finally, four machined mounting boss faces 38h formed on center section 38 interface with four machined mounting boss faces 32r formed on main housing 32, with these machined mounting boss faces all located on a single horizontal plane at installation to help ensure component machining and mating accuracy. This combination of design elements and installation techniques for aligning and installing center section 38 allows screws 39 to be self-tapping screws (i.e. thread-cutting or thread-forming screws), thereby eliminating a tapping procedure from the machining requirements that are employed to manufacture the four machined recesses 32t formed in main housing 32. This combination of design elements and installation techniques does not, however, preclude pre-tapping of machined recesses 32t. Center section 38 and housing 32 are generally symmetrical about a plane passing through the longitudinal axis of rotation of output shaft 36, as seen most clearly in FIG. 13, resulting in a more compact unit.

Figure 2:
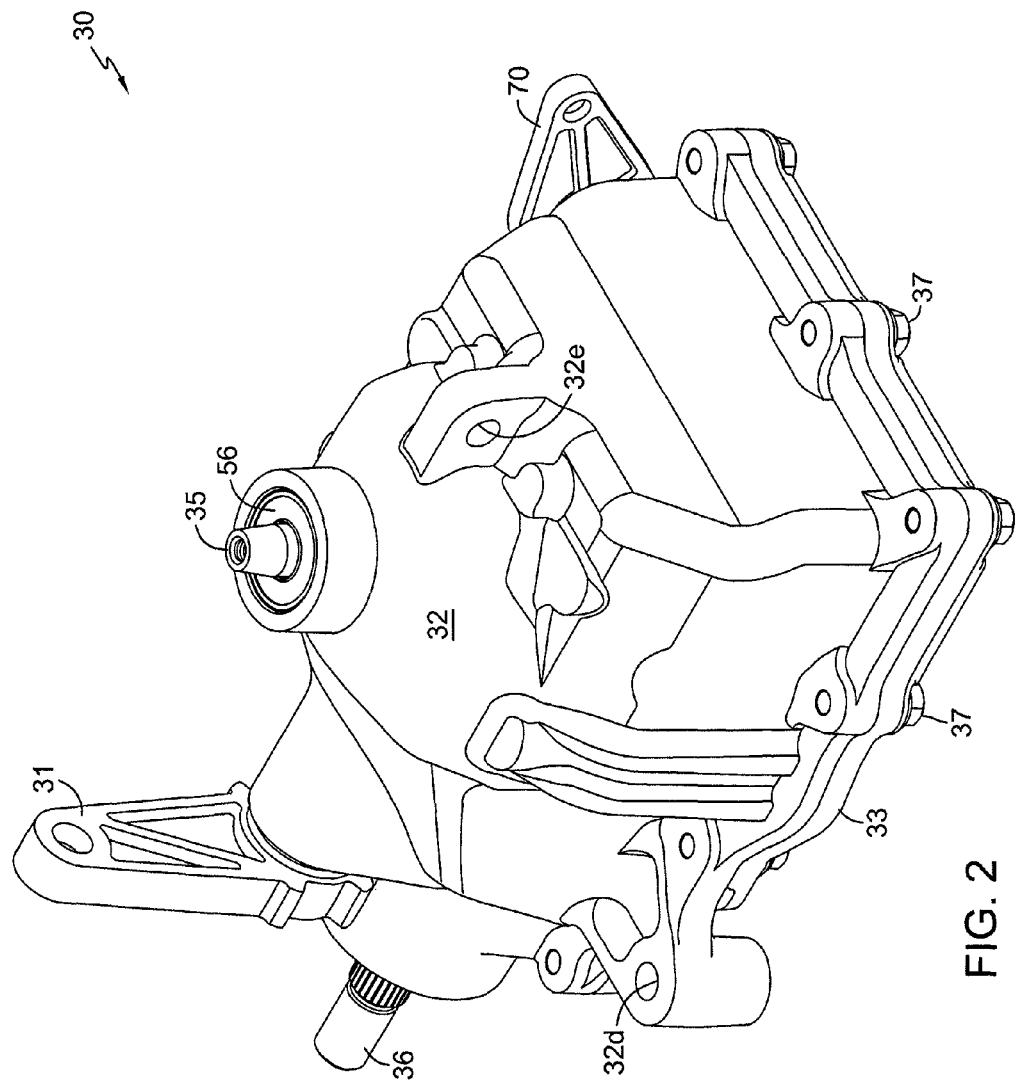
FIG. 2 is a perspective view of the transmission assembly of FIG. 1 rotated 180 degrees about the input shaft axis and with the fan and pulley assembly removed from the input shaft.

Referring primarily to FIGS. 1 and 2, a pulley and fan assembly 44 may be secured to the input shaft 35 of transmission assembly 30, as shown, to accept a drive belt and provide air flow to cool transmission assembly 30 when it is belt-driven. Alternatively, transmission assembly 30 may be driven directly by coupling a prime mover output shaft (not shown) or other drive shaft (not shown) to input shaft 35, or cooled by other means, such as a separate fan (not shown), when cooling is required. Modification of input shaft 35 may be required to accommodate direct coupling. Various shaft coupling methods are well known and will not be described in detail herein.

Referring primarily to FIGS. 1, 2 and 7, two mounting bosses 32*d* with hole centerlines located on a single vertical plane at a first end of transmission assembly 30, and at least one mounting lug 32*e* with a hole centerline located on a horizontal plane at an opposing end of transmission assembly 30, are provided to secure transmission assembly 30 to a vehicle or equipment frame structure. As shown in FIG. 7, alternatively positioned or additional lugs, such as lug 32*f* and lug 32*g*, both of which are illustrated using phantom lines, may be provided for additional mounting support or ease of installation of transmission assembly 30. Alternatively, mounting lugs 32*d*, 32*e*, 32*f*, and 32*g* may be omitted and a plurality of screws 37 replaced with studs (not shown) to attach transmission assembly 30 to a mounting plate of a vehicle (not shown).

Figure 14:
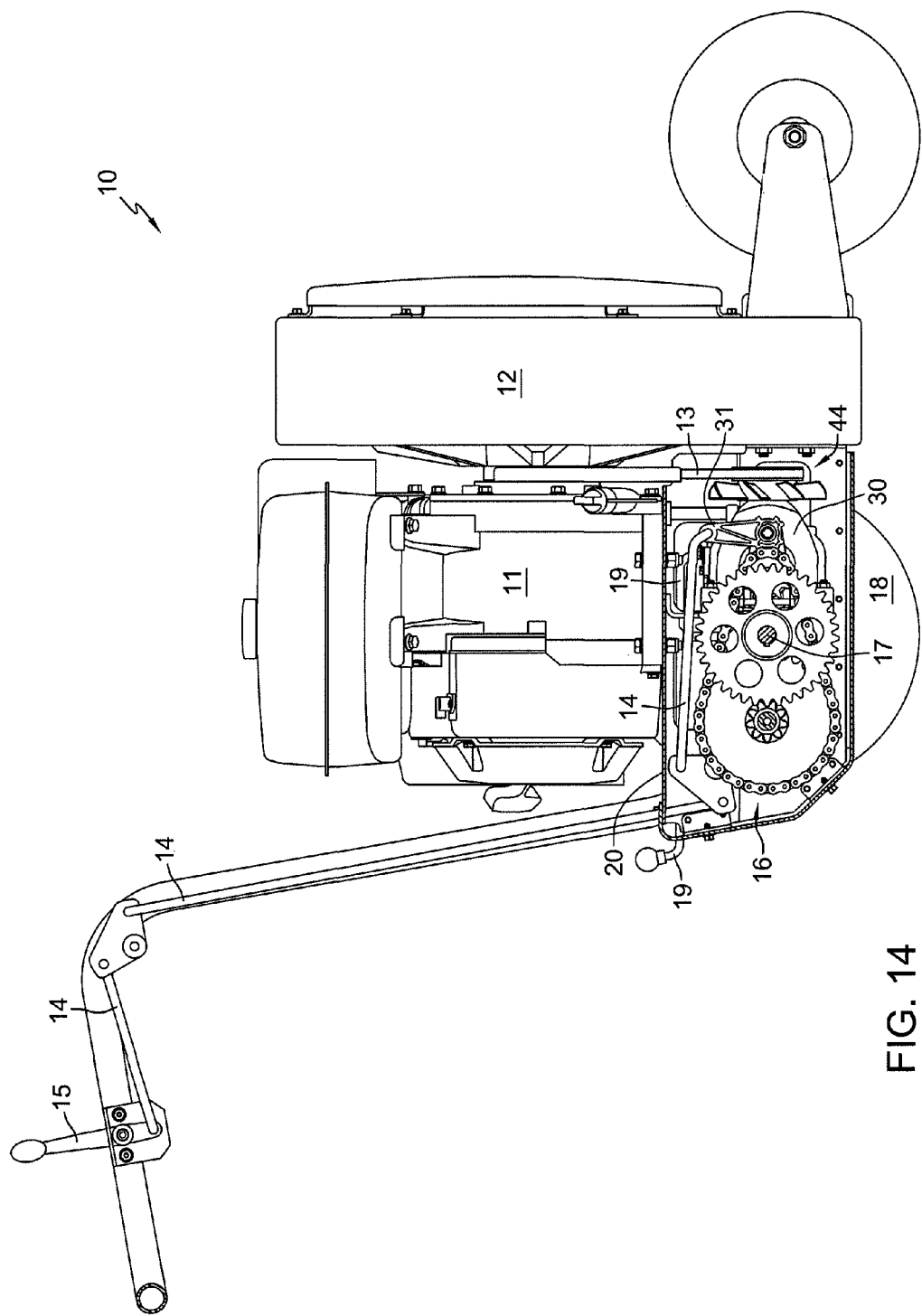
FIG. 14 is a side elevational view of a walk-behind leaf blowing machine with a portion of the frame cut away and one wheel removed for clarity, the leaf blowing machine incorporating the transmission assembly of FIG. 1 with an alternative mounting lug location as illustrated in FIG. 7.

As illustrated in FIG. 14, an exemplary wheeled leaf blowing machine or vehicle 10 comprises a prime mover 11 that drives a blower assembly 12 and a transmission drive belt 13 that engages pulley and fan assembly 44 to drive transmission assembly 30. The speed and rotation direction of output shaft 36 of transmission assembly 30, and therefore, the speed and direction of vehicle 10, is controlled by the operator of vehicle 10. Linkage assembly 14 connects an operator control lever 15 to the control arm 31 of transmission assembly 30. Output shaft 36 is drivingly engaged to a reduction gear set or gear train 16 which may include a roller chain, sprockets and gears, as shown, to drive an axle 17 that drives a pair of wheels 18. A bypass linkage 19 is provided to allow the operator to effectively disconnect the hydraulic fluid circuit in order to move vehicle 10 without the resistance associated with hydraulically driving the transmission. In this vehicle embodiment, prime mover 11, blower assembly 12, transmission assembly 30 and axle 17 are all securely attached to or mounted on a vehicle frame 20. As is well known, configurations of operator controls, control linkages, reduction gear sets or gear trains, vehicle frames, etc., can vary widely among vehicle and equipment configurations and manufacturers.

Figure 15:
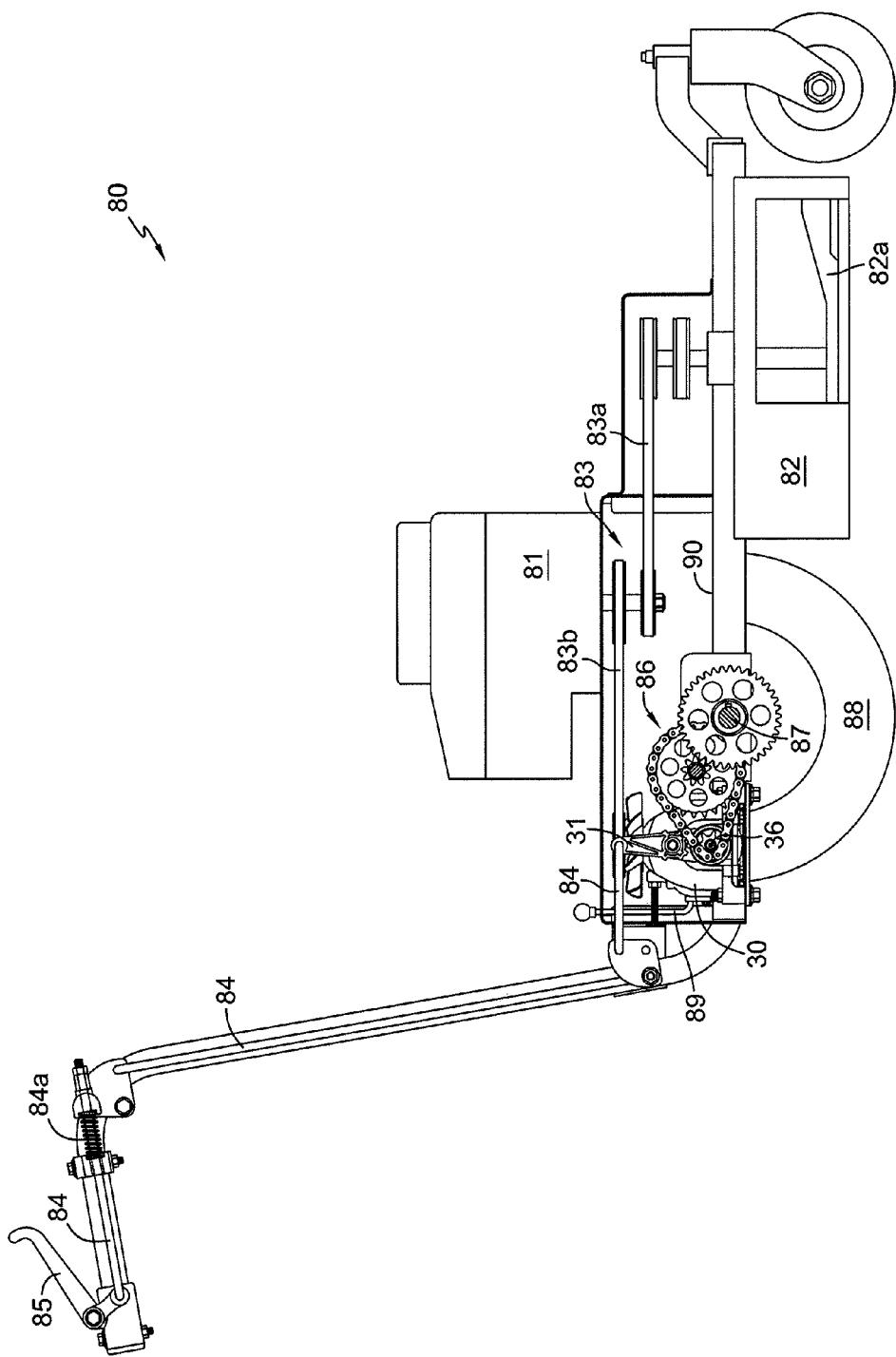
FIG. 15 is a side elevational view of a walk-behind mowing machine with a portion of the frame cut away and one wheel removed for clarity, the mowing machine incorporating the transmission assembly of FIG. 1 with an alternative mounting lug location as illustrated in FIG. 7.

As illustrated in FIG. 15, an exemplary mowing machine or vehicle 80 comprises a prime mover 81 that indirectly drives one or more blades 82*a* of mowing deck assembly 82 and also indirectly drives transmission assembly 30 by means of a pulley and belt system 83 comprising deck drive belt 83*a* and transmission drive belt 83*b*, respectively. A clutch or other known mechanism (not shown) may be used to selectively engage and disengage the blade(s) 82*a* of mowing deck assembly 82. As in the exemplary leaf blowing machine described previously herein, the speed and rotation direction of output shaft 36 of transmission assembly 30, and therefore, the speed and direction of vehicle 80, is controlled by the operator of vehicle 80. Linkage assembly 84 connects an operator control lever 85 to the control arm 31 of transmission assembly 30. A spring-operated return-to-neutral (RTN) mechanism 84*a* may be provided as part of linkage assembly 84 to return the control arm 31 of transmission assembly 30 to a neutral position when the operator releases lever 85. Output shaft 36 of transmission assembly 30 is drivingly engaged to a reduction gear set or gear train 86 which may include a roller chain, sprockets and gears, as shown, to drive axle 87 that drives a pair of wheels 88. A bypass linkage 89 is provided to allow the operator to conveniently bypass (or effectively disconnect) the hydraulic fluid circuit in order to move vehicle 80 without the resistance associated with hydraulically driving the transmission. In this vehicle embodiment, prime mover 81, transmission assembly 30 and axle 87 are all securely attached to or mounted on a vehicle frame 90. As mentioned previously herein, configurations of operator controls, control linkages, reduction gear sets or gear trains, vehicle frames, etc., can vary widely among vehicle and equipment configurations and manufacturers.

It will be understood that RTN mechanism 84*a* can be omitted and an alternate RTN mechanism (not shown) that includes a control arm (not shown) mounted on a transmission assembly that can be very similar in form to transmission assembly 30 (with relatively minor modifications to housing 32) may be used to return the transmission to a neutral position when the operator releases lever 85. An example of an RTN mechanism (including control arm) of this type is described in commonly-owned U.S. Pat. No. 6,968,687, the terms of which are incorporated herein by reference.

It will also be understood that the pulley and belt system can be omitted either partially or entirely and a transmission assembly 30 or transmission assembly very similar to transmission assembly 30 (with input shaft modification as needed) can be driven directly by the prime mover or a shaft driven by the prime mover. A mowing deck, for example, or other implement or apparatus, can also be driven by a shaft driven by the prime mover. Prime mover 11 or prime mover 81 could be an internal combustion engine, electric motor or the like.

Additional controls (not shown) may be provided to control the start-up and speed of prime mover 11 or prime mover 81, or a prime mover in an alternative embodiment (as described herein, but not shown), control a power take-off device (not shown) or control other functions of vehicles, machines or apparatuses to which transmission assembly 30 is applied.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

We claim:

1. An expansion bladder comprising:
   a rim having a circumference capable of being engaged to a transmission housing,
   wherein the transmission housing forms a sump for a transmission;
   a top surface spaced from the rim;
   a wall structure extending from the rim to the top surface, wherein an internal surface of the top surface and an internal surface of the wall structure are shaped to cooperate with a portion of the transmission housing to form an air chamber that is separated from the sump; and a plurality of ribs formed on the internal surface of the wall structure and extending into the air chamber, wherein each of the plurality of ribs extends from the rim to the top surface.

2. The expansion bladder of claim 1, wherein the wall structure is composed of a first end wall, a second end wall opposite the first end wall, a first side wall and a second side wall, wherein each side wall extends between the first end wall and the second end wall, and the plurality of ribs comprises a first pair of ribs formed on the first side wall and a second pair of ribs formed on the second side wall.

3. The expansion bladder of claim 2, wherein the first pair of ribs extend into the air chamber a first distance, and the second pair of ribs extend into the air chamber a second distance greater than the first distance.

4. The expansion bladder of claim 3, wherein the distance between the first pair of ribs is greater than the distance between the second pair of ribs.

5. The expansion bladder of claim 2, wherein one of the side walls further comprises a beveled surface adjacent the top surface.

6. The expansion bladder of claim 2, wherein one of the first pair of ribs is closer to the first side wall than is one of the second pair of ribs, and the other of the first pair of ribs is closer to the second side wall than is other of the second pair of ribs.

7. The expansion bladder of claim 1, further comprising a tab extending from the rim to assist in mounting the expansion bladder in the transmission housing.

8. The expansion bladder of claim 1, wherein the top surface has a second circumference that is smaller than the circumference of the rim.

9. A transaxle, comprising:
a housing forming a sump;
a transmission disposed in the sump and comprising a hydraulic pump connected to a hydraulic motor;
an expansion bladder disposed in the sump to form an air chamber separate from the sump and open to atmospheric pressure, the expansion bladder comprising:
a rim having a circumference and engaged to the housing;
a top surface spaced from the rim;
a wall structure extending from the rim to the top surface, wherein an internal surface of the top surface and an internal surface of the wall structure cooperate with the housing to form the air chamber; and
a plurality of ribs formed on the internal surface of the wall structure and extending into the air chamber, each rib having a pair of walls extending from the rim to the top surface.

10. The transaxle of claim 9, wherein the housing comprises a main housing section and a housing cover plate joined to the main housing section along a joint surface to form the sump.

11. The transaxle of claim 10, wherein the transmission comprises a center section having a pump running surface on which the hydraulic pump is disposed and a motor running surface on which the hydraulic motor is disposed, and wherein the axis of rotation of the hydraulic pump is perpendicular to the axis of rotation of the hydraulic motor and the joint surface between the housing cover plate and the main housing section is parallel to axis of rotation of the hydraulic motor.

12. The transaxle of claim 11, wherein at least a portion of the expansion bladder is disposed directly below the hydraulic pump.

13. The transaxle of claim 11, further comprising an opening in the housing cover plate and a bladder cover plate secured to an external surface of the housing cover plate to cover the opening, wherein an internal surface of the bladder cover plate cooperates with the internal surface of the wall structure to form the air chamber.

14. The transaxle of claim 11, further comprising a gasket formed around the circumference of the rim to assist in sealing the air chamber from the sump.

15. A transaxle, comprising:
a housing comprising a main housing section and a housing cover plate joined to the main housing section along a joint surface to form a sump;
a transmission disposed in the sump and comprising a center section having a pump running surface on which a hydraulic pump is disposed and a motor running surface on which a hydraulic motor is disposed;
a motor shaft engaged to and driven by the hydraulic motor, the motor shaft having a first axis of rotation that is parallel to a plane formed by the joint surface;
a pump shaft engaged to and driving the hydraulic motor, the pump shaft having a second axis of rotation that is perpendicular to the first axis of rotation; and
an expansion bladder disposed in the sump to form an air chamber that is separated from the sump and open to atmospheric pressure, the expansion bladder comprising a rim having a circumference and engaged the housing cover plate, a top surface spaced from the rim and a wall structure extending from the rim to the top surface.

16. The transaxle of claim 15, wherein at least a portion of the expansion bladder is disposed directly below the hydraulic pump.

17. The transaxle of claim 15, further comprising a plurality of ribs formed on an internal surface of the wall structure and extending into the air chamber.

18. The transaxle of claim 17, wherein each rib extends from the rim to the top surface.

19. The transaxle of claim 15, further comprising an opening formed in the housing cover plate and a bladder cover plate engaged to the housing cover plate to cover the opening, wherein an internal surface of the bladder cover plate and an internal surface of the wall structure form the air chamber.

20. The transaxle of claim 19, wherein the expansion bladder is engaged to both the housing cover plate and the bladder cover plate.

21. The transaxle of claim 15, wherein one end of the motor shaft extends out of the main housing section.

22. The transaxle of claim 21, wherein one end of the pump shaft extends out of the main housing section.

23. The transaxle of claim 17, wherein the circumference of the expansion bladder has a generally rectangular shape, having two end walls having a first length and two side walls having a second length, each side wall extending between the two end walls, wherein the second length is greater than the first length, and wherein the plurality of ribs comprises a first pair of ribs formed on one of the two side walls and a second pair of ribs formed on the other of the two side walls.

24. The transaxle of claim 23, wherein each rib extends from the rim to the top surface.

* * * * *